US012580429B2

(12) United States Patent
Choi et al.

(10) Patent No.: US 12,580,429 B2
(45) Date of Patent: Mar. 17, 2026

(54) DEVICE AND METHOD FOR PERFORMING POWER ALLOCATION AND OUT-BAND ACTIVATION BY USING SHORT-RANGE COMMUNICATION IN WIRELESS POWER TRANSMISSION SYSTEM

(71) Applicant: LG Electronics Inc., Seoul (KR)

(72) Inventors: Jingu Choi, Seoul (KR); Jinkwon Lim, Seoul (KR); Taeyoung Song, Seoul (KR); Yongcheol Park, Seoul (KR); Joonho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/805,733

(22) Filed: Aug. 15, 2024

(65) Prior Publication Data

US 2024/0405614 A1 Dec. 5, 2024

Related U.S. Application Data

(63) Continuation of application No. 17/431,253, filed as application No. PCT/KR2019/013589 on Oct. 16, 2019, now Pat. No. 12,095,289.

(30) Foreign Application Priority Data

Feb. 14, 2019 (KR) ........................ 10-2019-0017470

(51) Int. Cl.
*H02J 50/80* (2016.01)
*G08C 17/04* (2006.01)
*H02J 50/12* (2016.01)

(52) U.S. Cl.
CPC .............. *H02J 50/80* (2016.02); *G08C 17/04* (2013.01); *H02J 50/12* (2016.02)

(58) Field of Classification Search
CPC .......... H02J 50/80; H02J 50/12; H02J 50/402; H02J 50/60; G08C 17/04
See application file for complete search history.

(56) References Cited

U.S. PATENT DOCUMENTS 9,923,603 B2 * 3/2018 Won ........................ H02J 50/80
10,608,472 B2 * 3/2020 Lee ...................... H05B 6/1236
(Continued)

OTHER PUBLICATIONS

Wireless Powered Communication Networks: An Overview by Bi, Zeng and Zhang ("Bi") of Record in U.S. Appl. No. 17/431,253 entered Aug. 16, 2021 (Year: 2015).*

*Primary Examiner* — Rexford N Barnie
*Assistant Examiner* — Michael J Warmflash
(74) *Attorney, Agent, or Firm* — Fish & Richardson P.C.

(57) ABSTRACT

A wireless power receiver may comprise: a power pick-up circuit configured to receive power wirelessly from a wireless power transmitter including a plurality of primary coils by magnetic coupling to the wireless power transmitter at an operating frequency and to convert an alternating current signal induced by the wireless power into a direct current signal; a communication/control circuit receiving the direct current signal supplied from the power pick-up circuit and including an in-band communication module which communicates with the wireless power transmitter by using the operating frequency, and an out-band communication module which communicates with the wireless power transmitter by using any frequency except for the operating frequency; and a load configured to receive the direct current signal supplied from the power pick-up circuit, wherein the communication/control circuit transmits a message informing of the start of power allocation negotiation, to other wireless power receivers by using the out-band communication module.

5 Claims, 25 Drawing Sheets

10

(56) References Cited

U.S. PATENT DOCUMENTS

| 11,469,627 | B2 * | 10/2022 | Choi | ........................ | H02J 50/10 |
| 11,949,467 | B2 * | 4/2024 | Park | .................... | H02J 7/00045 |
| 12,095,289 | B2 * | 9/2024 | Choi | ........................ | H02J 50/60 |
| 2014/0361739 | A1 * | 12/2014 | Kwak | ..................... | H02J 50/70 |
| | | | | | 320/108 |
| 2016/0365747 | A1 * | 12/2016 | Redding | ................. | H02J 50/90 |
| 2017/0353054 | A1 * | 12/2017 | Lee | ........................... | H02J 5/00 |
| 2022/0069631 | A1 * | 3/2022 | Choi | ........................ | H02J 50/90 |

* cited by examiner

FIG. 3B

|          | b7 | b6 | b5 | b4 | b3 | b2 | b1 | b0 |
|----------|----|----|----|----|----|----|----|----|
| Byte 0   | Application Profile |||||||
| Byte 1   | Version |||||||
| Byte 2-N-1 | Profile-specific data |||||||

FIG. 4B

Host (470)

BR/EDR Profile
(25)

Generic Access Profile
(GAP, 24)

Generic Attribute Profile
(GATT, 23)

Attribute Protocol
(ATT, 22)

Logical Link Control and Adaptation Protocol
(L2CAP, 21)

Host Controller Interface
(HCI, 18)

Controller (460)

Link Manager
(LL, 16)

Link Controller
(LL, 14)

PHY
(12)

(a) BR/EDR Protocol Stack

Host (490)

LE Profile
(46)

Generic Access Profile
(GAP, 45)

Generic Attribute Profile
(GATT, 44)

Attribute Protocol
(ATT, 43)

Security Manager
(SM, 42)

Logical Link Control and Adaptation Protocol
(L2CAP, 21)

Host Controller Interface
(HCI, 36)

Controller (480)

Link Layer
(LL, 34)

PHY
(32)

(b) LE Protocol Stack

Figure 10:
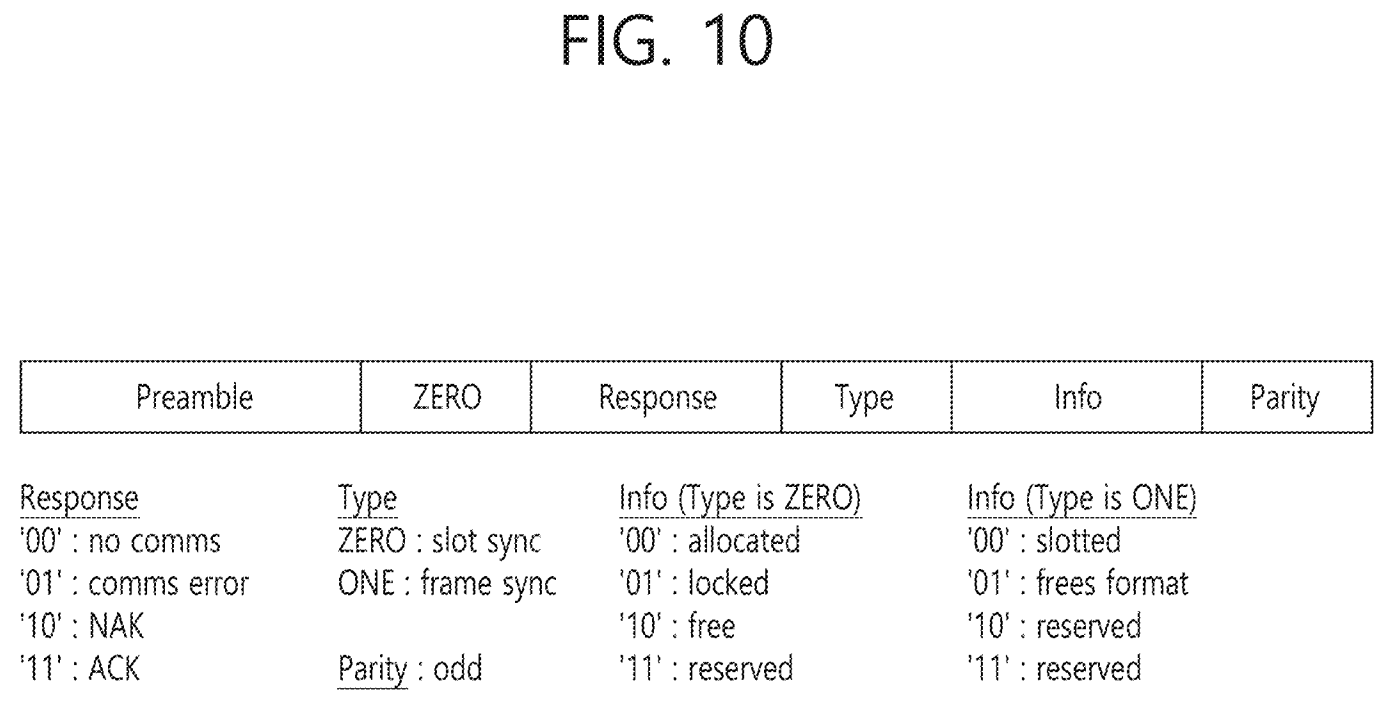

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

DEVICE AND METHOD FOR PERFORMING POWER ALLOCATION AND OUT-BAND ACTIVATION BY USING SHORT-RANGE COMMUNICATION IN WIRELESS POWER TRANSMISSION SYSTEM

CROSS-REFERENCE TO RELATED APPLICATIONS

This application is a continuation of U.S. application Ser. No. 17/431,253, filed on Aug. 16, 2021, which is a National Stage application under 35 U.S.C. § 371 of International Application No. PCT/KR2019/013589, filed on Oct. 16, 2019, which claims the benefit of Korean Patent Application No. 10-2019-0017470, filed on Feb. 14, 2019. The disclosures of the prior applications are incorporated by reference in their entirety.

BACKGROUND OF THE DISCLOSURE

Field of the Disclosure

The present disclosure relates to wireless charging, and more particularly, to an apparatus and method for allocating power between wireless power receivers and enabling an out-of-band communication function by using short-distance communication.

Related Art

Wireless power transmission technology is a technology that transmits electrical power without wires between a power source and an electronic device. As one example, the wireless power transmission technology allows the battery of a wireless terminal such as a smartphone or tablet to be charged simply by placing the wireless terminal on a wireless charging pad, thereby providing better mobility, convenience, and safety than the existing wired charging environment using a wired charging connector. The wireless power transmission technology is getting great attention as a means to replace the existing wired power transmission environment not only for wireless charging of wireless terminals but also for various other applications including electric vehicle, wearable device such as Bluetooth earphones or 3D glasses, home appliance, furniture, underground facility, building, medical device, robot, and leisure.

Wireless power transmission is also called contactless power transmission, no point of contact power transmission, or wireless charging. A wireless power transmission system may comprise a wireless power transmitter providing electrical energy through a wireless power transmission method and a wireless power receiver receiving electrical energy transmitted wirelessly from the wireless power transmitter and supplying power to a power receiving device such as a battery cell.

The wireless power transmission technology encompasses various methods such as a method for transmitting power through magnetic coupling, method for transmitting power through radio frequency (RF), method for transmitting power through microwaves, and method for transmitting power through ultrasonic waves. Magnetic coupling based methods are further divided into magnetic induction and magnetic resonance methods. The magnetic induction method transmits energy by using currents induced in a receiver-side coil due to the magnetic field generated at a transmitter-side coil battery cell according to electromagnetic coupling between the transmitter-side coil and the receiver-side coil. The magnetic resonance method is similar to the magnetic induction method in that it uses a magnetic field. However, the magnetic resonance method is different from the magnetic induction method in that resonance is generated when a specific resonant frequency is applied to the transmitter-side and receiver-side coils; and energy is transferred as a magnetic field is concentrated due to the generated resonance at both ends of the transmitter and receiver-sides. The magnetic induction scheme leads the standard in the wireless power consortium (WPC), and the magnetic resonance scheme leads the standard in the air fuel alliance (AFA).

According to the WPC standard, the wireless power transmitter and the wireless power receiver are designed to exchange various state information and commands related to the wireless power transmission system by using in-band communication. However, in case of the in-band communication, since it is not a system designed specifically for communication, it is not appropriate for the exchange of high-speed and large-capacity information and the exchange of various information. Therefore, there is ongoing discussion on a method of exchanging information related to a wireless power transmission system by combining the existing in-band communication with another wireless communication system (i.e., an out-band communication system). Out-of-band communication includes, for example, near field communication (NFC) and Bluetooth communication.

A core spec of short-range communication, in particular, Bluetooth Specification V4.0, may be divided into BR/EDR (Basic Rate/Enhanced Data Rate) and LE (Low Energy). The BR/EDR is a wireless communication technology occupying a dominant market position of a short-range WPAN technology and applied to many products. Meanwhile, low power Bluetooth (hereinafter, BLE) is devised aiming at high energy efficiency compared to the existing Bluetooth BR/EDR, as a technology released after the Bluetooth standard document V4.0.

Meanwhile, a wireless power transfer device may include a multi-coil to support various applications using wireless power transfer. The wireless power transfer device may transmit wireless power to a plurality of wireless power receivers based on a multi-coil. This may be referred to as one-to-many charging. In this case, since individual characteristics are different for each wireless power receiver, the wireless power transfer device should be capable of clearly identifying a plurality of wireless power receivers. In addition, for smooth control and management of one-to-many charging, a communication protocol between a wireless power transfer device and a plurality of wireless power receivers should be clearly defined.

When the wireless power receivers are detected or introduced, the wireless power transmitter performs a negotiation for power transmission suitable for each wireless power receiver. However, when the wireless power transmitter itself has a limitation in power that can be transmitted, maximum power requested by the wireless power receiver cannot be provided. In one-to-many charging in which one wireless power transmitter provides a power transmission service to a plurality of wireless power receivers, a negotiation has conventionally been performed between the wireless power transmitter and the wireless power receivers through in-band communication. However, since the in-band communication is characterized in low speed and communication is impossible between wireless power receivers, there is a problem in that a negotiation protocol is complex. For example, when the plurality of wireless power receivers transmit packets simultaneously, an additional protocol is required so that a collision does not occur between the packets, which results in a problem in that complexity of the in-band communication protocol increases.

In addition, conventionally, there is a problem in that a negotiation using out-band communication is impossible when power is off in a wireless power receiver since a short-range communication function or module (e.g., a Bluetooth function or module) is in a "disable" state.

SUMMARY

The present disclosure provides an apparatus and method for performing a negotiation for power allocation between wireless power receivers by using short-range communication in a wireless power transmission system.

The present disclosure also provides an apparatus and method for enabling an out-of-band communication function of a wireless power receiver in which the out-of-band communication function is in a disable state in a wireless power transmission system.

According to an aspect of the present disclosure, there is provided a wireless power receiver. The device may include a power pick-up unit configured to receive wireless power from a wireless power transmitter including a plurality of primary coils by magnetic coupling with the wireless power transmitter at an operating frequency, and to convert an alternating current (AC) signal generated by the wireless power into a direct current (DC) signal, a communication/control unit receiving the DC signal provided from the power pick-up unit and including an in-band communication module which communicates with the wireless power transmitter by using the operating frequency and an out-band communication module which communicates with the wireless power transmitter by using any frequency except for the operating frequency, and a load configured to receive the DC signal provided from the power pick-up unit. The communication/control unit may transmit, to a different wireless power receiver, a message informing of a start of a power allocation negotiation by using the out-band communication module.

In an aspect, the message informing of the start of the power allocation negotiation may include out-band identifiers of the wireless power receiver and the different wireless power receiver.

In another aspect, the message informing of the start of the power allocation negotiation may include an out-band identifier of the wireless power transmitter.

In another aspect, the communication/control unit may receive, from the different wireless power receiver, at least one of information on negotiation priority and information on request power of a corresponding wireless power receiver by using the out-band communication module.

In another aspect, the communication/control unit may transmit, to the wireless power transmitter, a result on the power allocation negotiation with the different wireless power receiver by using the out-band communication module.

In another aspect, the communication/control unit may transmit, to the out-band communication module, a capability check message for determining whether out-band communication is also possible even if the wireless power receiver is in a power-off state.

According to another aspect of the present disclosure, there is provided a wireless power transmitter supporting heterogeneous communication. The device may include a power conversion unit including a plurality of primary coils and configured to transmit wireless power to a wireless power receiver by using the primary coil forming magnetic coupling with the wireless power receiver at an operating frequency, and a communication/control unit including an in-band communication module which communicates with the wireless power receiver by using the operating frequency and an out-band communication module which communicates with the wireless power receiver by using any frequency except for the operating frequency. The communication/control unit may transmit a second message informing of a start of a power allocation negotiation to a different wireless power receiver by using the out-band communication module, upon receiving a first message informing of a start of a power allocation negotiation from the wireless power receiver.

In an aspect, the first message and the second message may include an out-band identifier of the wireless power transmitter.

In another aspect, the communication/control unit may receive at least one of information on negotiation priority and information on request power of a corresponding wireless power receiver from the wireless power receiver and the different wireless power receiver by using the out-band communication module.

In another aspect, the communication/control unit may allocate power to each wireless power receiver, based on at least one of information on negotiation priority and information on request power of each of the wireless power receivers.

In another aspect, the communication/control unit may determine a power transmission target from among the wireless power receiver and the different wireless power receiver, based on the information on the negotiation priority, if power requested by the wireless power receiver and different wireless power receiver cannot be provided.

According to another aspect of the present disclosure, there is provided a power allocation method performed by a wireless power receiver in a wireless power transmission system. The method may include transmitting, to a different wireless power receiver, a message information of a start of a power allocation negotiation by using out-band communication, receiving, from the different wireless power receiver, at least one of information on negotiation priority and information on request power of a corresponding wireless power receiver, determining respective power values for the wireless power receiver and the different wireless power receiver, based on at least one of the information on negotiation priority and the information on request power, and transmitting, to the wireless power transmitter, information on the determined power value.

In an aspect, the message informing of the start of the power allocation negotiation may include out-band identifiers of the wireless power receiver and the different wireless power receiver.

In another aspect, the message informing of the start of the power allocation negotiation may include an out-band identifier of the wireless power transmitter.

In another aspect, the method may further include determining whether the out-band communication module can be enabled also in a power-off state.

When a wireless power receiver in which an out-band communication function or module is in a disable state is detected by a wireless power transmitter or is placed on the wireless power transmitter, the out-band communication function or module of the wireless power receiver can be enabled, and thus a power allocation negotiation can be performed, thereby effectively operating the wireless power transmitter in a one-to-many wireless power transmission system using multiple coils.

BRIEF DESCRIPTION OF THE DRAWINGS

FIG. 3b illustrates one example of WPC NDEF in a wireless power transmission system.

FIG. 4b illustrates one example of Bluetooth communication architecture to which the present disclosure may be applied.

FIG. 5 is a state transition diagram illustrating a wireless power transfer procedure.

FIG. 10 illustrates a structure of a sync pattern according to one embodiment.

DESCRIPTION OF EXEMPLARY
EMBODIMENTS

The term "wireless power" used hereinafter refers to energy of arbitrary form related to electric, magnetic, and electromagnetic fields transferred from a wireless power transmitter to a wireless power receiver without using physical electromagnetic conductors. Wireless power may be called a wireless power signal and may refer to the oscillating magnetic flux enclosed by the primary and secondary coils. For example, this document describes power conversion in a system for charging devices including a mobile phone, cordless phone, iPod, MP3 player, and headset wirelessly. In general, the basic principles of wireless power transfer include power transfer through magnetic coupling, power transfer through radio frequency (RF), power transfer through microwaves, and power transfer through ultrasonic waves.

Figure 1:
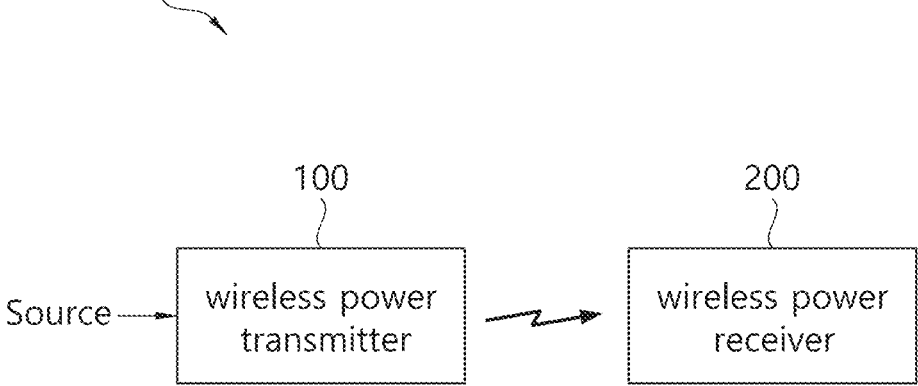
FIG. 1 illustrates a block diagram of a wireless power transmission system 10 according to one embodiment.
Figure 2:
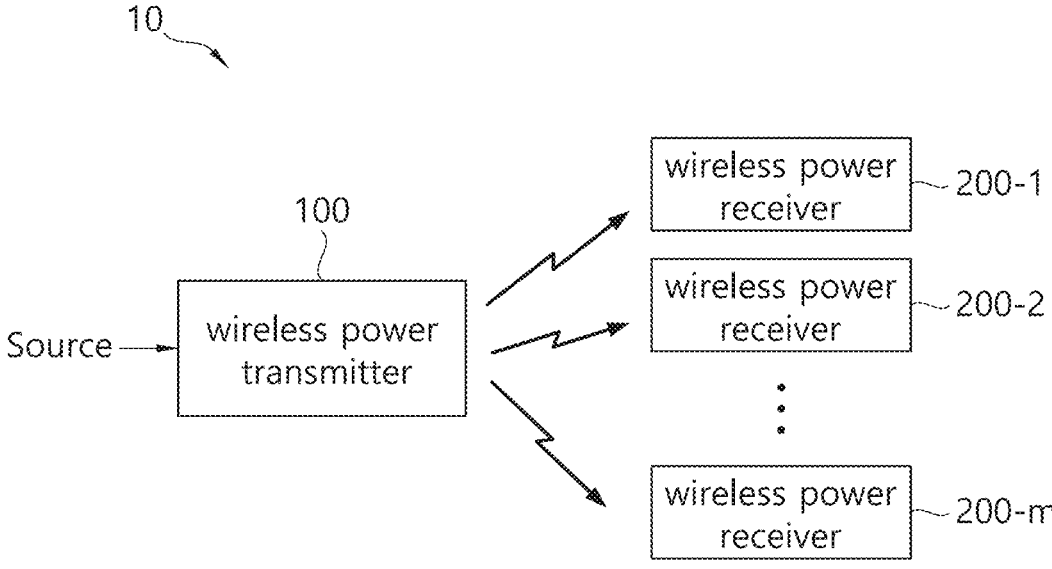
FIG. 2 illustrates a block diagram of a wireless power transmission system 10 according to another embodiment.

FIG. 1 illustrates a block diagram of a wireless power transmission system 10 according to one embodiment, and FIG. 2 illustrates a block diagram of a wireless power transmission system 10 according to another embodiment.

Referring to FIG. 1, the wireless power transmission system 10 includes a wireless power transmitter 100 and a wireless power receiver 200.

The wireless power transmitter 100 receives power from an external power source S and generates a magnetic field. The wireless power receiver 200 receives power wirelessly by generating currents by using the generated magnetic field.

Also, the wireless power transmitter 100 and the wireless power receiver 200 in the wireless power transmission system 10 may transmit and receive various pieces of information required for wireless power transfer. Here, communication between the wireless power transmitter 100 and the wireless power receiver 200 may be performed according to either in-band communication using a magnetic field used for wireless power transfer or out-band communication using a separate communication carrier. Out-band communication may also be called out-of-band communication. In what follows, the terms are unified as out-band communication. Examples of out-band communication include NFC, Bluetooth, and Bluetooth Low Energy (BLE).

Here, the wireless power transmitter 100 may be provided as a fixed or mobile type. Examples of fixed type transmitter include transmitters embedded in the indoor ceiling or wall or furniture such as a table; installed in the form of an implant in an outdoor parking lot, bus stop or subway station; or installed in a transportation means such as a vehicle or a train. The mobile type wireless power transmitter 100 may be implemented as a mobile device with a portable weight or size or as part of another device such as a cover of a notebook computer.

The wireless power receiver 200 should be construed as a comprehensive concept including various types of electronic devices equipped with a battery and various home appliances driven by receiving power wirelessly rather than through a power cable. Typical examples of the wireless power receiver 200 include a portable terminal, cellular phone, smart phone, Personal Digital Assistant (PDA), Portable Media Player (PMP), Wibro terminal, tablet, phablet, notebook, digital camera, navigation terminal, television, and electric vehicle (EV).

In the wireless power transmission system 10, the number of wireless power receiver 200 may be one or plural. Although FIG. 1 illustrates a case where the wireless power transmitter 100 and the wireless power receiver 200 transmit and receive power one-to-one, it is also possible that one wireless power transmitter 100 transmits power to a plurality of wireless power receivers 200-1, 200-2, . . . , 200-M. In particular, when wireless power transmission is conducted through a magnetic resonance scheme, one wireless power transmitter 100 may transmit power to multiple wireless power receivers 200-1, 200-2, . . . , 200-M simultaneously by applying a simultaneous transmission scheme or a time-division transmission scheme.

Also, although FIG. 1 illustrates a case where the wireless power transmitter 100 transmits power directly to the wireless power receiver 200, a separate transceiver such as a relay or repeater for increasing the wireless power transmission range may be introduced between the wireless power transmitter 100 and the wireless power receiver 200. In this case, power is transmitted from the wireless power transmitter 100 to the wireless power transceiver, and the wireless power transceiver again transmits power to the wireless power receiver 200.

In what follows, a wireless power receiver, power receiver, and receiver mentioned in the present specification refer to the wireless power receiver 200. Also, a wireless power transmitter, power transmitter, and transmitter mentioned in the present specification refer to the wireless power transmitter 100.

Figure 3A:
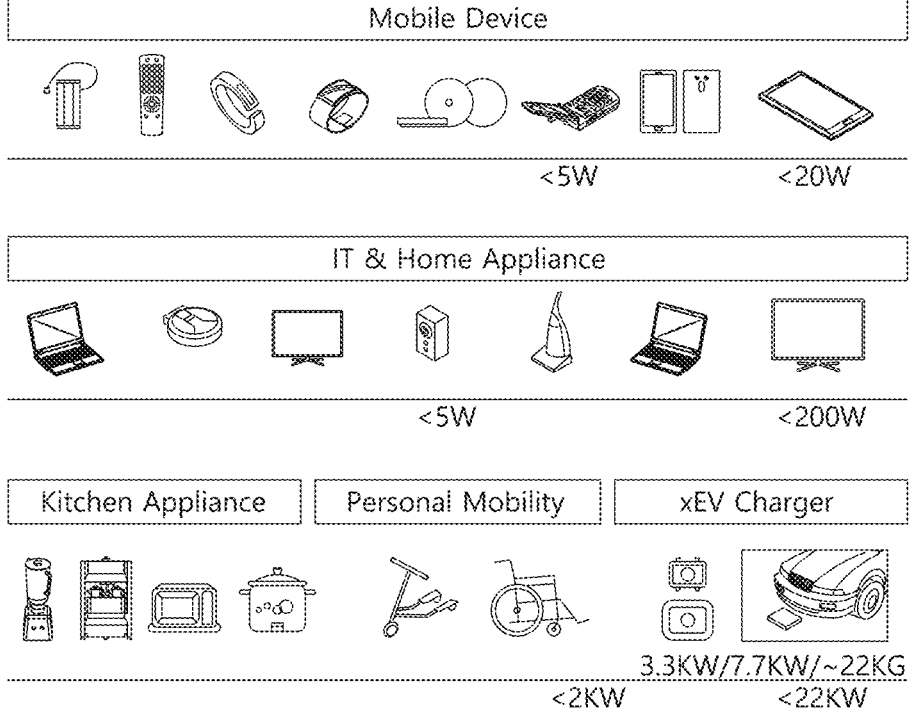
FIG. 3a illustrates examples of various electronic devices where a wireless power transmission system is employed.

FIG. 3a illustrates examples of various electronic devices where a wireless power transmission system is employed, and FIG. 3b illustrates one example of WPC NDEF in a wireless power transmission system.

FIG. 3a illustrates electronic devices categorized according to the amount of power transmitted and received in a wireless power transmission system. Referring to FIG. 3a, a small power (smaller than about 5 W or 20 W) wireless charging scheme may be applied to wearable devices such as a smart watch, smart glasses, Head Mounted Display (HMD), and smart ring; and mobile electronic devices (or portable electronic devices) such as an earphone, remote controller, smart phone, PDA, and tablet PC.

A medium power (smaller than about 50 W or 200 W) wireless charging scheme may be applied to medium-size/small-sized home appliances such as a notebook computer, robot vacuum cleaner, TV, audio device, vacuum cleaner, and monitor. A high power (small than about 2 kW or 22 kW) wireless charging scheme may be applied to kitchen appliances such as a blender, microwave oven, and electric rice cooker; and personal mobility devices (or electric device/mobility means) such as a wheelchair, electric kickboard, electric bicycle, and electric vehicle.

The electronic devices/mobility means described above (or shown in FIG. 1) may each include a wireless power receiver to be described later. Therefore, the aforementioned electronic devices/mobility means may be charged by receiving power wirelessly from a wireless power transmitter.

In what follows, descriptions are given with respect to a mobile device to which a wireless power charging scheme is applied, which is, however, only an example; a wireless charging method according to the present disclosure may be applied to various electronic devices described above.

Standards related to wireless power transmission include those developed by the Wireless Power Consortium (WPC), Air Fuel Alliance (AFA), and Power Matters Alliance (PMA).

WPC standards define baseline power profile (BPP) and extended power profile (EPP). BPP is related to a wireless power transmitter and a wireless power receiver which support 5 W power transmission, and EPP is related to a wireless power transmitter and a wireless power receiver which support transmission of power in the range larger than 5 W and less than 30 W.

Various wireless power transmitters and receivers using different power levels are dealt with by the respective standards and classified into different power classes or categories.

For example, the WPC classifies wireless power transmitters and receivers in terms of power class (PC) –1, PC0, PC1, and PC2; and provides standard specifications for the respective PCs. The PC–1 standard is related to wireless power transmitters and receivers that provide guaranteed power less than 5 W. Applications of the PC–1 include wearable devices such as smart watches.

The PC0 standard is related to wireless power transmitters and receivers providing guaranteed power of 5 W. The PC0 standard includes the EPP in which guaranteed power reaches up to 30 W. Although in-band (IB) communication is a mandatory communication protocol for the PC0 class, out-band (OOB) communication, which is used as a backup channel of the option, may also be used. A wireless power receiver may determine whether OOB is supported by setting an OOB flag within a configuration packet. A wireless power transmitter supporting the OOB may enter the OOB handover phase by transmitting a bit-pattern for OOB handover as a response to the configuration packet. The response to the configuration packet may be NAK, ND, or a newly defined 8-bit pattern. Applications of the PC0 include smart phones.

The PC1 standard is related to wireless power transmitter and receivers providing guaranteed power ranging from 30 W to 150 W. OOB is a mandatory communication channel for the PC1 class, and IB is used for initialization and link establishment toward OOB. A wireless power transmitter may enter the OOB handover phase by transmitting a bit-pattern for OOB handover as a response to the configuration packet. Applications of the PC1 include lap-top computers or power tools.

The PC2 standard is related to wireless power transmitter and receivers providing guaranteed power ranging from 200 W to 2 kW, applications of which include kitchen appliances.

As described above, PCs may be distinguished according to the power level, and whether to support compatibility within the same PC may be set as optional or mandatory. Here, compatibility within the same PC indicates that power transmission and reception is possible within the same PC. For example, if a wireless power transmission of PC x is able to charge a wireless power receiver in the same PC x, it may be regarded that compatibility is maintained within the same PC. Similarly to the case above, compatibility between different PCs may also be supported. Here, compatibility between different PCs indicates that power transmission and reception is possible between different PCs. For example, if a wireless power transmitter of PC x is able to charge a wireless power receiver in PC y, it may be regarded that compatibility is maintained between different PCs.

Support of compatibility between PCs is a very important issue from a perspective of user experience and infrastructure development. However, maintaining compatibility between PCs cause various technical problems as follows.

In the case of compatibility within the same PC, for example, a wireless power receiver based on a lap-top charging scheme capable of providing reliable charging only when power is transmitted continuously may run into a problem in receiving power reliably from a wireless power transmitter based on a power tool scheme that transmits power discontinuously. Also, in the case of compatibility between different PCs, for example, when a wireless power transmitter of which the minimum guaranteed power is 200 W transmits power to a wireless power receiver of which the maximum guaranteed power is 5 W, there is a risk that the wireless power receiver is damaged due to overvoltage. As a result, it is difficult to take the PC as an indicator/reference that represents/indicates compatibility.

Wireless power transmitters and receivers may provide very convenient user experience and interface (UX/UI). In other words, a smart wireless charging service may be provided. A smart wireless charging service may be implemented based on the UX/UI of the smart phone including a wireless power transmitter. To implement the application, an interface between the processor of the smart phone and the wireless power receiver allows "drop and play" two-way communication between the wireless power transmitter and receiver.

As one example, a user may experience a smart wireless charging service at a hotel. If the user comes into a hotel room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Welcome to ### hotel. Select "Yes" to activate smart charging functions: Yes | No Thanks". The smart phone receives a user input selecting Yes or No Thanks and performs the next procedure selected by the user. If Yes is selected, the smart phone transmits the corresponding information to the wireless charger. And the smart phone and the wireless charger perform the smart charging function together.

The smart wireless charging service may also include receiving auto-filled WiFi credentials. For example, the wireless charger transmits the WiFi credentials to the smart phone, and the smart phone automatically inputs the WiFi credentials received from the wireless charger by executing an appropriate app.

The smart wireless charging service may also include executing a hotel application that provides a hotel promotion or obtaining remote check-in/check-out and contact information.

As another example, the user may experience the smart wireless charging service inside a vehicle. If the user gets into the vehicle and places a smart phone on a wireless charger, the wireless charger transmits wireless power to the smart phone, and the smart phone receives wireless power. During this process, the wireless charger transmits information about the smart wireless charging service to the smart phone. If the smart phone detects that it is placed on the wireless charger, detects reception of wireless power, or receives information about the smart wireless charging service from the wireless charger, the smart phone enters a state in which it inquires the user about the identity.

In this state, the smart phone is automatically connected to the vehicle via WiFi and/or Bluetooth. the smart phone may display a message on the screen with or without an alarm sound. One example of the message may include sentences such as "Welcome to your car. Select "Yes" to synch device with in-car controls: Yes | No Thanks". The smart phone receives a user input selecting Yes or No Thanks and performs the next procedure selected by the user. If Yes is selected, the smart phone transmits the corresponding information to the wireless charger. And by executing in-vehicle application/display software, the smart phone and wireless charger may perform the in-vehicle smart control function together. The user may enjoy desired music and check a regular map position. The in-vehicle application/display software may include a function that provides synchronized access for passersby.

As yet another example, the user may experience smart wireless charging at home. If the user enters a room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Hi xxx, Would you like to activate night mode and secure the building?: Yes | No Thanks". The smart phone receives a user input selecting Yes or No Thanks and performs the next procedure selected by the user. If Yes is selected, the smart phone transmits the corresponding information to the wireless charger. The smart phone and the wireless charger may at least recognize the user pattern and recommend the user to lock doors and windows, turn off lights, or set an alarm.

In what follows, 'profile' will be newly defined as an indicator/reference that represents/indicates compatibility. In other words, it may be construed that compatibility is maintained among wireless power transmitters and receivers having the same 'profile' to enable stable power transmission and reception whereas power transmission and reception is impossible among wireless power transmitters and receivers having different 'profiles'. The profile may be defined according to compatibility and/or application regardless of (or independently of) power class.

For example, profiles may be divided largely into four cases: i) mobile, ii) power tool, iii) kitchen, and iv) wearable profile.

In the case of 'mobile' profile, PC may be defined as PC0 and/or PC1; communication protocol/scheme as IB and OOB; and operating frequency ranges from 87 kHz to 205 kHz, where examples of application include smart phones and lap-top computers.

In the case of 'power tool' profile, PC may be defined as PC1; communication protocol/scheme as IB; and operating frequency ranges from 87 kHz to 145 kHz, where examples of application include power tools.

In the case of 'kitchen' profile, PC may be defined as PC2; communication protocol/scheme as NFC-based; and operating frequency is less than 100 kHz, where examples of application include kitchen or home appliances.

In the case of power tool and kitchen profiles, NFC communication may be employed between a wireless power transmitter and receiver. By exchanging WPC NFC Data Exchange Profile Format (NDEF), the wireless power transmitter and receiver may confirm that they are NFC devices. For example, as shown in FIG. 3b, the WPC NDEF may include application profile field (for example, IB), version field (for example, IB), and profile specific data (for example, IB). The application profile field indicates whether the corresponding apparatus uses i) mobile and computing, ii) power tool, or iii) kitchen profile; upper nibble of the version field indicates the major version; and lower nibble of the version field indicates the minor version. Also, the profile specific data defines contents for kitchen.

In the case of 'wearable' profile, PC may be defined as PC−1; communication protocol/scheme as IB; and operating frequency ranges from 87 kHz to 205 kHz, where examples of application include wearable devices worn on the user's body.

Maintaining compatibility may be mandatory in the same profile, but optional between different profiles.

The profiles described above (mobile profile, power tool profile, kitchen profile, and wearable profile) may be generalized to first to n-th profiles, and new profiles may be added to/substituted for old profiles according to the WPC specification and embodiments.

In case profiles are defined as described above, a wireless power transmitter may perform power transmission selectively only to the wireless power receiver of the same profile as the wireless power transmitter, thereby enabling more stable power transmission. Also, since the burden on the wireless power transmitter is reduced, and power transmission to incompatible wireless power receivers is not attempted, the risk of damaging a wireless power receiver is reduced.

The PC1 in the 'mobile' profile may be defined by borrowing an optional extension such as OOB based on the PC0 while, in the case of 'power tool' profile, it may be defined simply as a modified version of the PC1 'mobile' profile. Also, until now, the wireless transmission technology has been defined in an attempt to maintain compatibility within the same profile; however, in the future, it may be further developed in a direction of maintaining compatibility between different profiles.

The AFA standard refers to a wireless power transmitter as a Power Transmitting Unit (PTU) and refers to a wireless power receiver as a Power Receiving Unit (PRU). PTUs are classified into a plurality of classes as shown in Table 1, and PRUs are classified into a plurality of categories as shown in Table 2.

TABLE 1

| | $P_{TX\_IN\_MAX}$ | Minimum Category Support Requirements | Minimum Value for Maximum Devices Supported |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Example Applications |
|---|---|---|
| Category 1 | TBD | Bluetooth headset |
| Category 2 | 3.5 W | Feature phone |
| Category 3 | 6.5 W | Smart phone |
| Category 4 | 13 W | Tablet, Phablet |
| Category 5 | 25 W | Laptop with a small form factor |
| Category 6 | 37.5 W | Regular laptop |
| Category 7 | 50 W | Home appliance |

As shown in Table 1, the maximum output power capability of a class n PUT is larger than or equal to the $P_{TX\_IN\_MAX}$ value of the corresponding class. A PRU is not allowed to draw larger power than specified in the corresponding category.

Figure 4A:
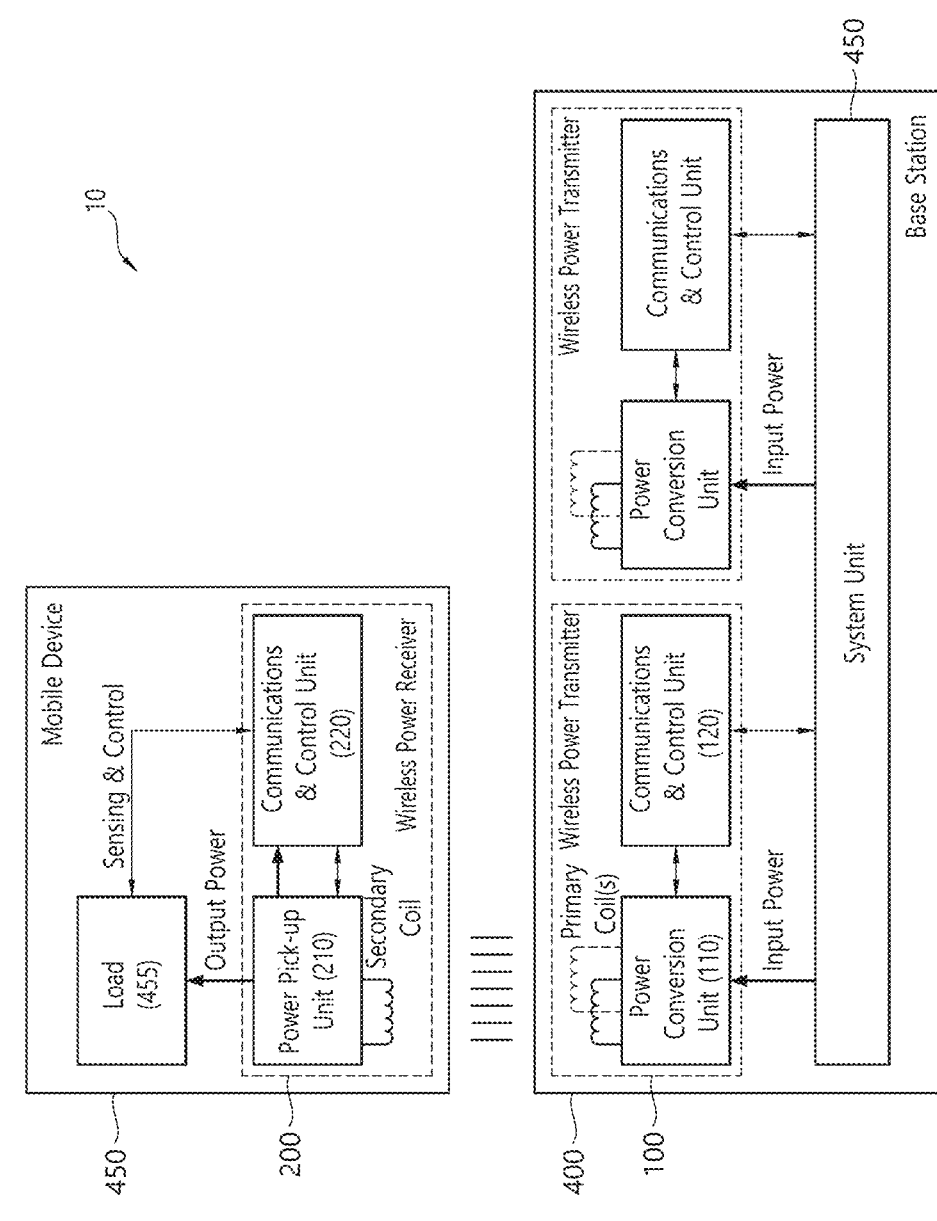
FIG. 4a illustrates a block diagram of a wireless power transmission system according to another embodiment.

FIG. 4a illustrates a block diagram of a wireless power transmission system according to another embodiment. FIG. 4b illustrates one example of Bluetooth communication architecture to which the present disclosure may be applied.

Referring to FIG. 4a, the wireless power transmission system 10 includes a mobile device 450 receiving power wirelessly and a base station 400 transmitting power wirelessly.

The base station 400 provides inductive power or resonant power and may include at least one wireless power transmitter 100 and a system unit 405. The wireless power transmitter 100 may transmit inductive or resonant power and control transmission. The wireless power transmitter 100 may include a power conversion unit 110 that converts electric energy to a power signal by generating a magnetic field through the primary coil(s) and a communication/control unit 120 that controls communication with the wireless power receiver 200 and power transmission so that power may be transmitted at an appropriate level. The system unit 405 may perform control of input power provisioning, control of a plurality of wireless power transmitters, and control of other operation of the base station such as user interface control.

The primary coil may generate an electromagnetic field by using AC power (or voltage or current). The primary coil may receive AC power (or voltage or current) at a particular frequency output from the power conversion unit 110 and generate a magnetic field at the particular frequency. The magnetic field may be generated in a non-radial or radial direction, and the wireless power receiver 200 receive the magnetic field to generate a current. In other words, the primary coil transmits power wirelessly.

In the magnetic induction method, the primary and secondary coils may have arbitrarily suitable shapes; for example, the coils may be realized by copper wires wound around a high permeability member such as ferrite or amorphous metal. The primary coil may also be called primary core, primary winding, or primary loop antenna. Meanwhile, the secondary coil may also be called secondary core, secondary winding, secondary loop antenna, or pickup antenna.

When the magnetic resonance method is used, the primary and secondary coils may be provided in the form of a primary resonant antenna and a secondary resonant antenna. A resonant antenna may have a resonance structure including a coil and a capacitor. At this time, the resonant frequency of the resonant antenna is determined by the inductance of the coil and capacitance of the capacitor. Here, the coil may be formed to have a loop shape. Also, a core may be disposed inside the loop. The core may include a physical core such as a ferrite core or an air core.

Energy transfer between the primary resonant antenna and the secondary resonant antenna may be achieved through the resonance phenomenon of a magnetic field. Resonance is a phenomenon in which high efficiency energy transfer occurs between two resonant antennas when one of the two resonant antennas generates a near field corresponding to the resonant frequency, the other resonant antenna is located in the vicinity of the field generating antenna, and the two resonant antennas are coupled to each other. If a magnetic field corresponding to the resonant frequency is generated between the first and the second resonant antennas, a phenomenon that the first and the second resonant antennas resonate to each other occurs; accordingly, the magnetic field is concentrated towards the secondary resonant antenna with a higher efficiency than a normal case in which the magnetic field generated at the first resonant antenna is radiated into the free space; and thereby energy may be transferred from the first resonant antenna to the secondary resonant antenna with high efficiency. The magnetic induction method may be implemented similarly to how the magnetic resonance method is implemented; however, in this case, the frequency of the magnetic field doesn't have to be the resonant frequency. Instead, in the magnetic induction method, matching is needed between the loops forming the primary and the secondary coils, and spacing between the loops has to be very close.

Although not shown in the figure, the wireless power transmitter 100 may further include a communication antenna. The communication antenna may transmit and receive a communication signal by using a communication carrier in addition to magnetic field communication. For example, the communication antenna may transmit and receive a communication signal based on WiFi, Bluetooth, Bluetooth LE, ZigBee, or NFC.

The communication/control unit 120 may transmit and receive information to and from the wireless power receiver 200. The communication/control unit 120 may include at least one of an IB communication module or OOB communication module.

The IB communication module may transmit and receive information by using magnetic waves that use a specific frequency as the center frequency. For example, the communication/control unit 120 may perform in-band communication by loading information on magnetic waves and transmitting the magnetic waves through the primary coil or receive magnetic waves carrying information through the primary coil. At this time, by using modulation methods like Binary Phase Shift Keying (BPSK) or Amplitude Shift Keying (ASK) scheme or coding methods like Manchester coding or non-return-to-zero level (NZR-L) coding, information may be loaded into magnetic waves or magnetic waves carrying information may be interpreted. By using the IB communication, the communication/control unit 120 may transmit and receive information up to several meters at a data rate of several kbps.

The OOB communication module may perform out-band communication through the communication antenna. For example, the communication/control unit 120 may be provided as a short-range communication module. Examples of a short-range communication module include communication modules based on Wi-Fi, Bluetooth, Bluetooth LE, ZigBee, and NFC.

The communication/control unit 120 may control the overall operation of the wireless power transmitter 100. The communication/control unit 120 may perform computation and processing of various pieces of information and control each constituting element of the wireless power transmitter 100.

The communication/control unit 120 may be implemented by a computer or a device similar to the computer by using hardware, software, or a combination thereof. In hardware, the communication/control unit 120 may be provided in the form of an electronic circuit that processes electric signals and performs control functions. In software, the communication/control unit 120 may be provided in the form of a program that drives the hardware for the communication/control unit 120.

The communication/control unit 120 may control transmission power by controlling an operating point. The operating point to be controlled may correspond to a combination of a frequency (or phase), duty cycle, duty ratio, and voltage amplitude. The communication/control unit 120 may control transmission power by adjusting at least one of the frequency (or phase), duty cycle, duty ratio, and voltage amplitude. Also, the wireless power receiver 200 may control reception power by controlling the resonant frequency while the transmitter 100 supplies constant power.

The mobile device 450 includes a wireless power receiver 200 that receives wireless power through the secondary coil and a load 455 that receives and stores the power received by the wireless power receiver 200 and supplies the stored power to a device.

The wireless power receiver 200 may include a power pick-up unit 210 and communication/control unit 220. The power pick-up unit 210 may receive wireless power through the secondary coil and convert the received wireless power to electric energy. The power pick-up unit 210 rectifies an AC signal obtained through the secondary coil to convert to a DC signal. The communication/control unit 220 may control transmission and reception of wireless power (power transmission and reception).

The secondary coil may receive wireless power transmitted from the wireless power transmitter 100. The secondary coil may receive power by using a magnetic field generated at the primary coil. Here, in case a particular frequency is the resonant frequency, magnetic resonance is generated between the primary and secondary coils, and the secondary coil may receive power more efficiently.

Although not shown in FIG. 4a, the communication/control unit 220 may further include a communication antenna. The communication antenna may transmit and receive a communication signal by using a communication carrier in addition to magnetic field communication. For example, the communication antenna may transmit and receive a communication signal based on WiFi, Bluetooth, Bluetooth LE, ZigBee, or NFC.

The communication/control unit 220 may transmit and receive information to and from the wireless power receiver 100. The communication/control unit 220 may include at least one of an IB communication module or OOB communication module.

The IB communication module may transmit and receive information by using magnetic waves that use a specific frequency as the center frequency. For example, the communication/control unit 220 may perform in-band communication by loading information on magnetic waves and transmitting the magnetic waves through the secondary coil or receive magnetic waves carrying information through the secondary coil. At this time, by using modulation methods like Binary Phase Shift Keying (BPSK) or Amplitude Shift Keying (ASK) scheme or coding methods like Manchester coding or non-return-to-zero level (NZR-L) coding, information may be loaded into magnetic waves or magnetic waves carrying information may be interpreted. By using the IB communication, the communication/control unit 220 may transmit and receive information up to several meters at a data rate of several kbps.

The OOB communication module may perform out-band communication through the communication antenna. For example, the communication/control unit 220 may be provided as a short-range communication module.

Examples of a short-range communication module include communication modules based on Wi-Fi, Bluetooth, Bluetooth LE, ZigBec, and NFC.

The communication/control unit 220 may control the overall operation of the wireless power receiver 200. The communication/control unit 220 may perform computation and processing of various pieces of information and control each constituting element of the wireless power receiver 200.

The communication/control unit 220 may be implemented by a computer or a device similar to the computer by using hardware, software, or a combination thereof. In hardware, the communication/control unit 220 may be provided in the form of an electronic circuit that processes electric signals and performs control functions. In software, the communication/control unit 120 may be provided in the form of a program that drives the hardware for the communication/control unit 220.

When the communication/control unit 120 and the communication/control unit 220 employ Bluetooth or Bluetooth LE as an OOB communication module or short-range communication module, the communication/control unit 120 and the communication/control unit 220 may operate by implementing the communication architecture as shown in FIG. 4b.

FIG. 4b shows one example of a protocol stack of the Bluetooth Basic Rate (BR)/Enhanced Data Rate (EDR) that supports GATT and one example of a protocol stack of Bluetooth Low Energy (LE).

More specifically, the Bluetooth BR/EDR protocol stack may include an upper controller stack 460 and a lower host stack 470 with respect to a host controller interface (HCl) 18.

The host stack (or host module) 470 refers to hardware for transmitting or receiving a Bluetooth packet to and from a wireless transceiver module receiving a Bluetooth signal of 2.4 GHz. The controller stack 460 is connected to a Bluetooth module and controls the Bluetooth module and performs an operation.

The host stack 470 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls the overall operation (link setup, control, security) of a Bluetooth connection by utilizing a link manager protocol (LMP).

The link manager layer 16 may perform the following functions.

The link manager layer 16 may perform ACL/SCO logical transport, logical link setup, and control.

Detach: The link manager layer 16 stops connection and informs a counterpart device about the reason for stopping connection.

The link manager layer 16 performs power control and role switch.

The link manager layer 16 performs a security (authentication, pairing, and encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, attribute protocol (ATT) 22, generic attribute profile (GATT) 23, generic access profile (GAP) 24, and BR/EDR profile 25.

The logical link control and adaptive protocol (L2CAP) 21 may provide a two-way channel for transmitting data to a specific protocol or a profile.

The L2CAP 21 may multiplex various protocols and profiles provided from a Bluetooth higher position.

The L2CAP of the Bluetooth BR/EDR uses a dynamic channel; supports a protocol service multiplexer, retransmission, and a streaming mode; and provides segmentation and reassembly, per-channel flow control, and error control.

The generic attribute profile (GATT) 23 may operate as a protocol describing how the attribute protocol 22 is used in configuring services. For example, the generic attribute profile 23 may operate to specify how ATT attributes are grouped together into services and operate to describe features associated with services.

Thus, the GATT 23 and the ATT 22 may use features in order to describe status and services of a device and describe how the features are related to each other and how the features used.

The attribute protocol 22 and the BR/EDR profile 25 define a service (profile) using the Bluetooth BR/EDR and define an application protocol for exchanging data; and the generic access profile (GAP) 24 defines device discovery, connection and security level.

Next, the Bluetooth LE protocol stack includes a controller stack 30 that may be operated to process a wireless device interface for which timing is important, and a host stack 40 that may be operated to process high level data.

First, the controller stack 480 may be implemented by using a communication module that may include a Bluetooth wireless device, for example, a processor module that may include a processing device such as a microprocessor.

The host stack 490 may be implemented as part of an OS operated on the processor module or may be implemented as instantiation of a package on the OS.

In some examples, the controller stack and the host stack may be operated or executed on the same processing device within the processor module.

The controller stack 480 includes a physical layer (PHY) 32, link layer (LL) 34, and host controller interface (HCl) 36.

The physical layer (PHY) (wireless transceiver module) 32 is a layer for transmitting and receiving a 2.4 GHz wireless signal and uses Gaussian frequency shift keying (GFSK) modulation and a frequency hopping technique including 40 RF channels.

The link layer (LL) 34 serving to transmit or receive a Bluetooth packet provides a function of generating a connection between devices after performing an advertising and scanning function using three advertising channels, and exchanging data packets of a maximum of 257 bytes through 37 data channels.

The host stack may include a generic access profile (GAP) 40, a logical link control and adaptation protocol (L2CAP) 41, a security manager (SM) 42, an attribute protocol (ATT) 440, a generic attribute profile (GATT) 44, a generic access profile (GAP) 25, and an LT profile 46. However, the host stack 490 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage multicast data transmission.

In the Bluetooth LE, three fixed channels (one for a signaling channel, one for a security manager, and one for an attribute protocol) are basically used, and a dynamic channel may be used if necessary.

Meanwhile, in the BR/EDR, a dynamic channel is used by default, and a protocol service multiplexer, retransmission, streaming mode, and the like, are supported.

The SM 42 is a protocol for authenticating a device and providing a key distribution.

The ATT 43 defines a rule for accessing data of a counterpart device in a server-client structure. The ATT 43 includes six types of messages (request, response, command, notification, indication, and confirmation) as follows.

1) Request and Response message: A request message is a message for a client device to request specific information from a server device, and the response message, which is a response message with respect to the request message, refers to a message that may be used for transmission from the server device to the client device.
2) Command message: It is a message transmitted from the client device to the server device mainly to indicate a command of a specific operation. The server device does not transmit a response with respect to the command message to the client device.
3) Notification message: It is a message transmitted from the server device to the client device in order to notify of an event or the like. The client device does not transmit a confirm message with respect to the notification message to the server device.
4) Indication and confirm message: It is a message transmitted from the server device to the client device in order to notify of an event or the like. Unlike the notification message, the client device transmits a confirm message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, which is a layer newly implemented for the Bluetooth LE technology, is used to select a role for communication between Bluetooth LE devices and to control how a multi-profile operation takes place.

Also, the generic access profile (GAP) 45 is mainly used for device discovery, connection generation, and security procedure; defines a scheme for providing information to a user; and defines attribute types as follows.

1) Service: It defines a basic operation of a device by using a combination of behaviors related to data
2) Include: It defines a relationship between services
3) Characteristics: It is a data value used in a service
4) Behavior: It is a format that may be read by a computer defined by a UUID (value type).

The LE profile 46, including profiles dependent upon the GATT, is mainly applied to Bluetooth LE devices. The LE profile 46 may include, for example, Battery, Time, FindMe, Proximity, Time, and the like, and details of the GATT-based profiles are as follows.

1) Battery: Battery information exchanging method
2) Time: Time information exchanging method
3) FindMe: Provision of alarm service according to distance
4) Proximity: Battery information exchanging method The generic attribute profile (GATT) 44 may operate as a protocol describing how the attribute protocol (ATT) 43 is used when services are configured. For example, the GATT 44 may operate to define how ATT attributes are grouped together into services and operate to describe features associated with services.

Thus, the GATT 44 and the ATT 43 may use features in order to describe status and services of a device and describe how the features are related to each other and used.

Hereinafter, procedures of the Bluetooth low energy (BLE) technology will be briefly described.

The BLE procedure may be classified as a device filtering procedure, advertising procedure, scanning procedure, discovering procedure, and connecting procedure.

Device Filtering Procedure

The device filtering procedure is a method for reducing the number of devices making a response to a request, indication, notification, and the like in the controller stack.

When requests are received from all the devices, it is not necessary to respond to the requests. Therefore, the controller stack may perform control to reduce the number of transmitted requests so that power consumption is reduced in the BLE controller.

An advertising device or scanning device may perform the device filtering procedure to limit the number of devices receiving an advertising packet, scan request or connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, if the scanning device receives some advertising packets from the advertising device, the scanning device has to transmit a scan request to the advertising device.

However, if a device filtering procedure is used and obviates scan request transmission, the scanning device may disregard the advertising packets transmitted from the advertising device.

Even in a connection request process, the device filtering procedure may be used. If device filtering is used in the connection request process, it becomes unnecessary to transmit a response to the connection request by disregarding the connection request.

Advertising Procedure

The advertising device performs an advertising procedure to perform undirected broadcast to devices within a region.

Here, the undirected broadcast is advertising toward all the devices rather than broadcast toward a specific device, and all the devices may scan advertising to make an additional information request or a connection request.

In contrast to the undirected broadcast, in the directed broadcast, only the device designated as a reception device may make an additional information request or a connection request by scanning advertising.

The advertising procedure is used to establish a Bluetooth connection with a nearby initiating device.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising device transmits a response to the scan request to the device which has transmitted the scan request through the same advertising physical channel in which the scan request has been received.

Broadcast user data sent as part of advertising packets are dynamic data while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may restart advertising after the connected mode.

Scanning Procedure

A device performing scanning, that is, a scanning device performs a scanning procedure to listen to undirected broadcast of user data from advertising devices using an advertising physical channel.

The scanning device transmits a scan request to an advertising device through an advertising physical channel in order to request additional data from the advertising device. The advertising device transmits a scan response in response to the scan request by including therein additional user data which has been requested by the scanning device through the advertising physical channel.

The scanning procedure may be used while being connected to other BLE device in the BLE piconet.

If the scanning device is in an initiator mode in which the scanning device may receive an advertising event and initiate a connection request, the scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

A device available for Bluetooth communication (hereinafter, referred to as "Bluetooth device") performs an advertising procedure and a scanning procedure to discover devices in the vicinity thereof or to be discovered by other devices within a given area.

The discovering procedure is performed asymmetrically. A Bluetooth device attempting to discover other nearby device is termed a discovering device and listens to discover devices advertising an advertising event that may be scanned. A Bluetooth device which may be discovered and used by other device is termed a discoverable device and actively broadcasts an advertising event so that it may be scanned by other device through an advertising (broadcast) physical channel.

Both the discovering device and the discoverable device may have already been connected with other Bluetooth devices in a piconet.

Connecting Procedure

A connecting procedure is asymmetrical and requests that, while a specific Bluetooth device is performing an advertising procedure, other Bluetooth devices should perform a scanning procedure.

In other words, an advertising procedure may become the goal, and as a result, only one device may respond to the advertising. After a connectable advertising event is received from an advertising device, a connecting request may be transmitted to the advertising device through an advertising (broadcast) physical channel to initiate connection.

Hereinafter, operational states in the BLE technology, that is, an advertising state, scanning state, initiating state, and connection state will be briefly described.

Advertising State

A link layer (LL) enters an advertising state according to an instruction from a host (stack). If the LL is in the advertising state, the LL transmits an advertising packet data unit (PDU) from advertising events.

Each of the advertising events include at least one advertising PDU, and the advertising PDUs are transmitted through an advertising channel indexes in use. After the advertising PDU is transmitted through an advertising channel index in use, the advertising event may be terminated, or if the advertising device needs to secure a space for performing other function, the advertising event may be terminated earlier.

Scanning State

The LL enters the scanning state according to an instruction from the host (stack). In the scanning state, the LL listens to advertising channel indexes.

The scanning state includes two types: passive scanning and active scanning. Each of the scanning types is determined by the host.

A separate time period for performing scanning or an advertising channel index is not defined.

During the scanning state, the LL listens to an advertising channel index in a scan window (scanWindow) duration. A scan interval (scanInterval) is defined as an interval between start points of two contiguous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and is unable to transmit any packet.

In the active scanning, the LL performs listening in order to rely on an advertising PDU type capable of requesting additional information related to advertising PDUs and an advertising device from the advertising device.

Initiating State

The LL enters the initiating state according to an instruction from the host (stack).

When the LL is in the initiating state, the LL performs listening to advertising channel indexes.

In the initiating state, the LL listens to an advertising channel index during the scan window interval.

Connection State

When a device performing a connection request, that is, an initiating device transmits a CONNECT_REQ PDU to an advertising device or when the advertising device receives a CONNECT_REQ PDU from the initiating device, the LL enters a connection state.

It is considered that a connection is generated after the LL enters the connection state. However, it is not necessary that the connection should be established at the time the LL enters the connection state. The only difference between a newly generated connection and a pre-established connection is an LL connection supervision timeout value.

When two devices are connected, the two devices play different roles.

An LL serving as a master is termed a master, and an LL serving as a slave is termed a slave. The master adjusts timing of a connection event, and the connection event refers to a time point at which the master and the slave are synchronized to each other.

Hereinafter, packets defined in the Bluetooth interface will be briefly described. BLE devices use packets as defined below.

Packet Format

The LL has only one packet format used for both of an advertising channel packet and a data channel packet.

Each packet includes four fields of a preamble, an access address, a PDU, and a CRC.

When one packet is transmitted in an advertising channel, the PDU may become an advertising channel PDU, and when one packet is transmitted in a data channel, the PDU may become a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|----------|-------------|
| 0000 | ADV_IND |
| 0001 | ADV_DIRECT_IND |
| 0010 | ADV_NONDIRECT_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in the advertising state and received by the LL in the scanning state or in the initiating state.

Scanning PDU

The following advertising channel DPU types are termed scanning PDUs and are used in a state described below.

SCAN_REQ: Transmitted by the LL in the scanning state and received by the LL in the advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may have a 16-bit header and payload having various sizes and may include a message integrity check (MIC) field.

The procedures, states, and packet formats in the BLE technology described above may be applied to perform the methods proposed in the present specification.

Referring again to FIG. 4a, the load 455 may be a battery. A battery may store energy by using power output from the power pick-up unit 210. Meanwhile, a battery does not necessarily need to be included in the mobile device 450. For example, a battery may be provided as an external entity in a removable form. In another example, instead of the battery, the wireless power receiver 200 may have a driving means to drive various operations of an electronic device.

Although the figure illustrates a case where the mobile device 450 includes the wireless power receiver 200, and the base station 400 includes the wireless power transmitter 100, the wireless power receiver 200 may be considered to be the same as the mobile device 450, and the wireless power transmitter 100 may be considered to be the same as the base station 400 in a broad sense.

Figure 4C:
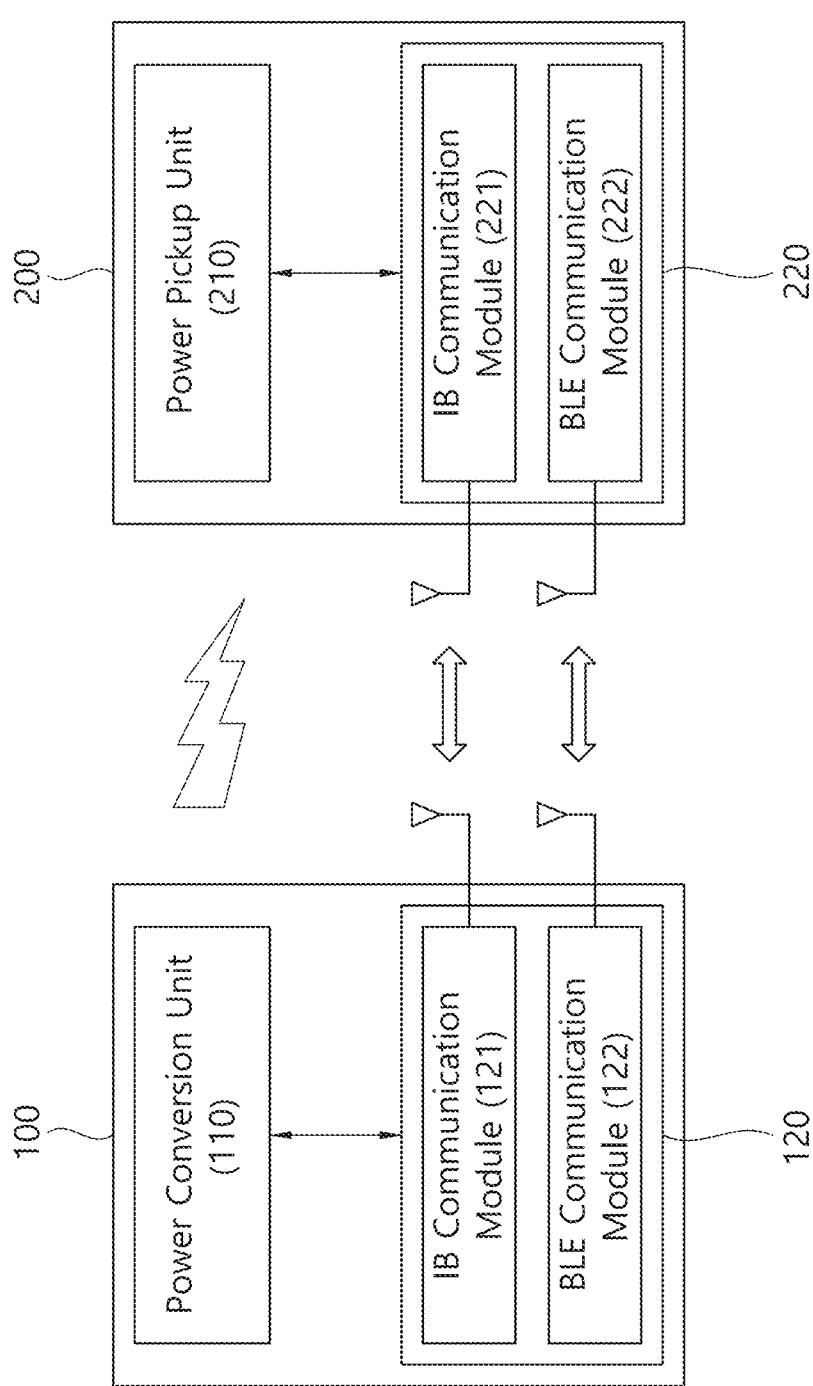
FIG. 4c illustrates a block diagram of a wireless power transmission system employing BLE communication according to one example.

If the communication/control unit 120 and the communication/control unit 220 include a Bluetooth or Bluetooth LE module as an OOB communication module or short-range communication module in addition to an IB communication module, the wireless power transmitter 100 including the communication/control unit 120 and the wireless power receiver 200 including the communication/control unit 220 may be expressed by a simplified block diagram as shown in FIG. 4c.

Figure 4D:
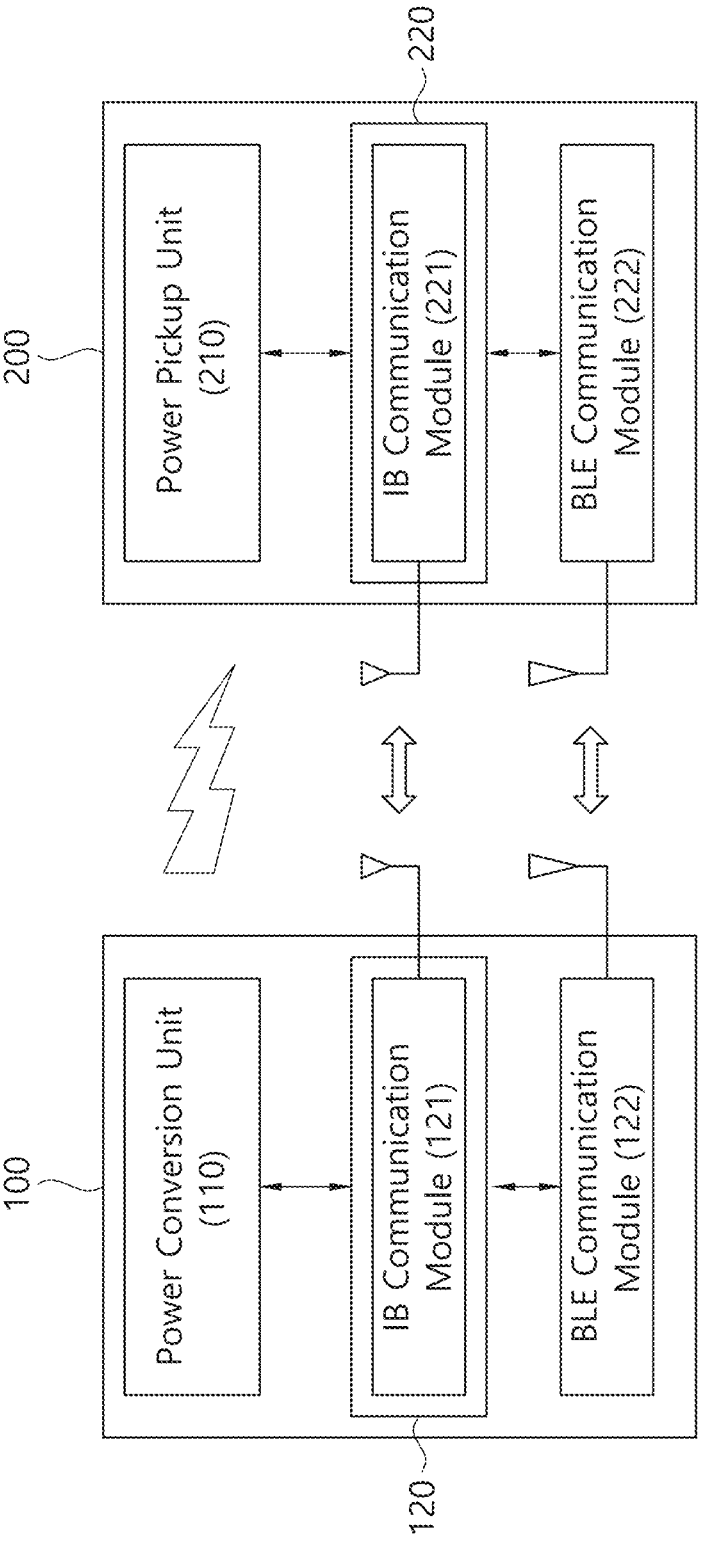
FIG. 4d illustrates a block diagram of a wireless power transmission system employing BLE communication according to another example.

FIG. 4c illustrates a block diagram of a wireless power transmission system employing BLE communication according to one example, and FIG. 4d illustrates a block diagram of a wireless power transmission system employing BLE communication according to another example.

Referring to FIG. 4c, the wireless power transmitter 100 includes a power conversion unit 110 and a communication/control unit 120. The communication/control unit includes an in-band communication module 121 and a BLE communication module 122.

Meanwhile, the wireless power receiver 200 includes a power pickup unit 210 and a communication/control unit 220. The communication/control unit 220 includes an in-band communication module 221 and a BLE communication module 222.

In one aspect, the BLE communication modules 122, 222 adopt the architecture and perform operation according as shown in FIG. 4b. For example, the BLE communication modules 122, 222 may be used to establish access between the wireless power transmitter 100 and the wireless power receiver 200 and to exchange control information and packets required for wireless power transmission.

In another aspect, the communication/control unit 120 may be configured to operate a profile for wireless charging. Here, a profile for wireless charging may be the GATT using BLE transmission.

Meanwhile, the communication/control units 120, 220 may also be implemented in a way that each of the communication/control units includes only the in-band communication module 121, 221 and the BLE communication modules 122, 222 are installed separately from the communication/control units 120, 220.

In what follows, a coil or a coil unit may refer to a coil assembly, coil cell, or cell including a coil and at least one element adjacent to the coil.

In what follows, a coil or a coil unit may refer to a coil assembly, coil cell, or cell including a coil and at least one element adjacent to the coil.

Figure 5:
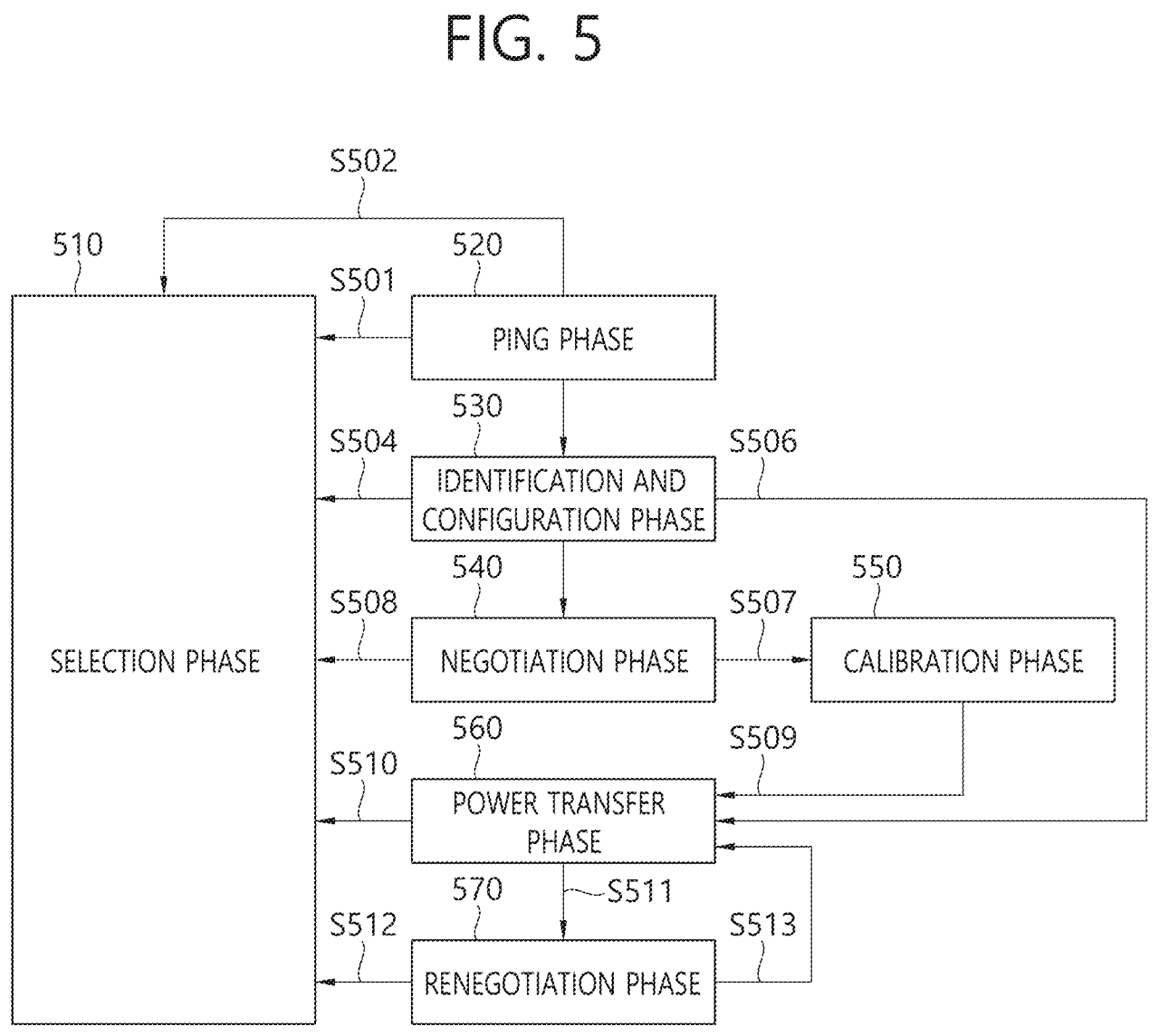

FIG. 5 is a state transition diagram illustrating a wireless power transfer procedure.

Referring to FIG. 5, power transmission from a wireless power transmitter to a wireless power receiver according to one embodiment of the present disclosure may be largely divided into a selection phase 510, ping phase 520, identification and configuration phase 530, negotiation phase 540, calibration phase 550, power transfer phase 560, and renegotiation phase 570.

The selection phase 510 may be a phase to which the current phase—for example, it may correspond to S501, S502, S504, S508, S510, and S512—transitions when power transmission is started or a specific error or a specific event is detected while power transmission is maintained. Here, the specific error or specific event will be made clear from the following description. In addition, in the selection phase 510, the wireless power transmitter may monitor whether an object is present on an interface surface. Upon detecting that the object is present on the interface surface, the process may be shifted to the ping phase 520. In the selection phase 510, the wireless power transmitter may transmit an analog ping signal with a very short pulse and may detect whether an object is present in an activate area of the interface surface based on a current change in the transmission coil or primary coil.

If an object is detected in the selection phase 510, the wireless power transmitter may measure a quality factor of a wireless power resonant circuit (for example, power transmission coil and/or resonant capacitor). In one embodiment of the present disclosure, if an object is detected in the selection phase 510, the quality factor may be measured to determine whether a wireless power receiver is placed in the charging area together with a foreign object. In the case of a coil used for the wireless power transmitter, inductance and/or series resistance component of the coil may be reduced due to environmental change, which accordingly reduces the quality factor. To determine existence of a foreign object by using the measured quality factor, the wireless power transmitter may receive, from the wireless power receiver, a reference quality factor value measured in advance when no foreign object is placed within the charging area. In the negotiation phase 540, the received reference quality factor value is compared with a measured quality factor value to determine existence of a foreign object. However, in the case of a wireless power receiver where the reference quality factor value is low—for example, a specific wireless power receiver may have a low reference quality factor value according to the type, intended use, and characteristics of the specific wireless power receiver— there may not be a significant difference between the measured quality factor and the reference quality factor even in the presence of a foreign object, which may cause a problem in determining existence of the foreign object. Therefore, existence of a foreign object has to be determined by taking into account other decisive factor or by using other method.

In another embodiment of the present disclosure, if an object is detected in the selection phase 510, a quality factor within a specific frequency range (for example, the operating frequency range) may be measured to determine whether the wireless power receiver has been disposed together with a foreign object in the charging area. In the case of a coil used for the wireless power transmitter, inductance and/or series resistance component of the coil may be reduced due to environmental change, which may accordingly change (shift) the resonant frequency of the coil of the wireless power transmitter. In other words, the quality factor peak frequency, which is the frequency at which the maximum quality factor value is measured within the operating frequency range, may be moved.

In the ping phase 520, upon detecting an object, the wireless power transmitter may wake up the wireless power receiver and may transmit a digital ping for determining whether the detected object is the wireless power receiver. In the ping phase 520, if the wireless power transmitter does not receive a response signal to the digital ping, for example, a signal strength packet, from the wireless power receiver, the ping phase 620 may re-transition to the selection phase 510. Also, in the ping phase 520, upon receiving a signal indicating that power transmission is completed, namely, a charging complete packet, from the wireless power receiver, the wireless power transmitter may transition to the selection phase 510.

When the ping phase 520 is completed, the wireless power transmitter may transition to the identification and configuration phase 530 for identifying a wireless power receiver and collecting configuration and status information of the wireless power receiver.

In the identification and configuration phase 530, if an unexpected packet is received, an expected packet is not received for a predetermined period of time (time out), a transmission error occurs, or no power transfer contact is set, the wireless power transmitter may transition to the selection phase 510.

The wireless power transmitter may check whether transition to the negotiation phase 540 is needed based on a negotiation field value of a configuration packet received in the identification and configuration phase 530. If it is turned out from the checking result that a negotiation is needed, the wireless power transmitter may enter the negotiation phase 540 and perform a predetermined Foreign Object Detection (FOD) procedure. On the other hand, if it is found from the checking result that a negotiation is not needed, the wireless power transmitter may immediately transition to the power transfer phase 560. When the wireless power transmitting device and the wireless power receiving device support out-band communication such as BLE, in the identification and configuration phase 530, the out-band communication module of the wireless power transmitting device receives an ID or identification packet of the wireless power receiving device, and exchanges a message related to a configuration required in power transfer.

In the negotiation phase 540, the wireless power transmitter may receive a Foreign Object Detection (FOD) status packet including a reference quality factor value. Or, the wireless power transmitter may receive an FOD status packet including a reference peak frequency value. Or, the wireless power transmitter may receive a status packet including a reference quality factor value and a reference peak frequency value. At this time, the wireless power transmitter may determine a quality coefficient threshold for FOD based on the reference quality factor value. The wireless power transmitter may determine the peak frequency threshold for FOD based on the reference peak frequency value.

The wireless power transmitter may detect whether a foreign object exists in a charging area by using a quality coefficient threshold for the determined FOD and a currently measured quality factor value (a quality factor value measured before the ping phase) and may control power transmission according to the FOD result. As one example, if an FO is detected, power transmission may be stopped, but the present disclosure is not limited to the specific case.

The wireless power transmitter may detect existence of an FO in a charging area by using the peak frequency threshold for a determined FOD and a currently measured peak frequency value (a peak frequency value measured before the ping phase) and may control power transmission according to the FOD result. As one example, if an FO is detected, power transmission may be stopped, but the present disclosure is not limited to the specific case.

If an FO is detected, the wireless power transmitter may return to the selection phase 510. On the other hand, if an FO is not detected, the wireless power transmitter may enter the power transfer phase 560 via the calibration phase 550. More specifically, if an FO is not detected, the wireless power transmitter may determine strength of power received by the wireless power receiver in the calibration phase 550 and measure power loss at the wireless power transmitter and receiver to determine the strength of power transmitted by the wireless power transmitter. In other words, the wireless power transmitter may predict power loss based on a difference between transmission power at the wireless power transmitter and reception power at the wireless power receiver in the calibration phase 550. The wireless power transmitter according to one embodiment may calibrate the threshold for FOD by taking into account the predicted power loss.

When the wireless power transmitting device and the wireless power receiving device support out-band communication such as BLE, in the calibration phase 550, the in-band communication modules of the wireless power transmitting device and wireless power receiving device may exchange information required in a foreign matter detection algorithm based on a charging profile.

In addition, when the wireless power transmitting device and the wireless power receiving device support out-band communication such as BLE, in the negotiation phase 540, connected BLE communication may be used to exchange and negotiate information related to wireless power transfer. In addition, when the exchange of the information related to wireless power transfer is complete through the BLE during the negotiation phase 540, the out-band communication module may report this to the in-band communication module (or control unit) and may transfer a start power transfer message to the in-band communication module (or control unit).

In the power transfer phase 560, if an unexpected packet is received, an expected packet is not received for a predetermined period of time (time out), preset power transfer contract violation occurs, or charging is completed, the wireless power transmitter may transition to the selection phase 510.

Also, in the power transfer phase 560, if a power transfer contract needs to be reconfigured depending on a state change of the wireless power transmitter, the wireless power transmitter may transition to the renegotiation phase 570. At this time, if renegotiation is completed normally, the wireless power transmitter may return to the power transfer phase 560.

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The power transfer contract may be set based on state and characteristics information of the wireless power transmitter and receiver. For example, the state information of the wireless power transmitter may include information about a maximum transmissible power amount, information about the maximum number of wireless power receivers that may be accommodated, and so on and the state information of the wireless power receiver may include information about required power and so on.

Figure 6:
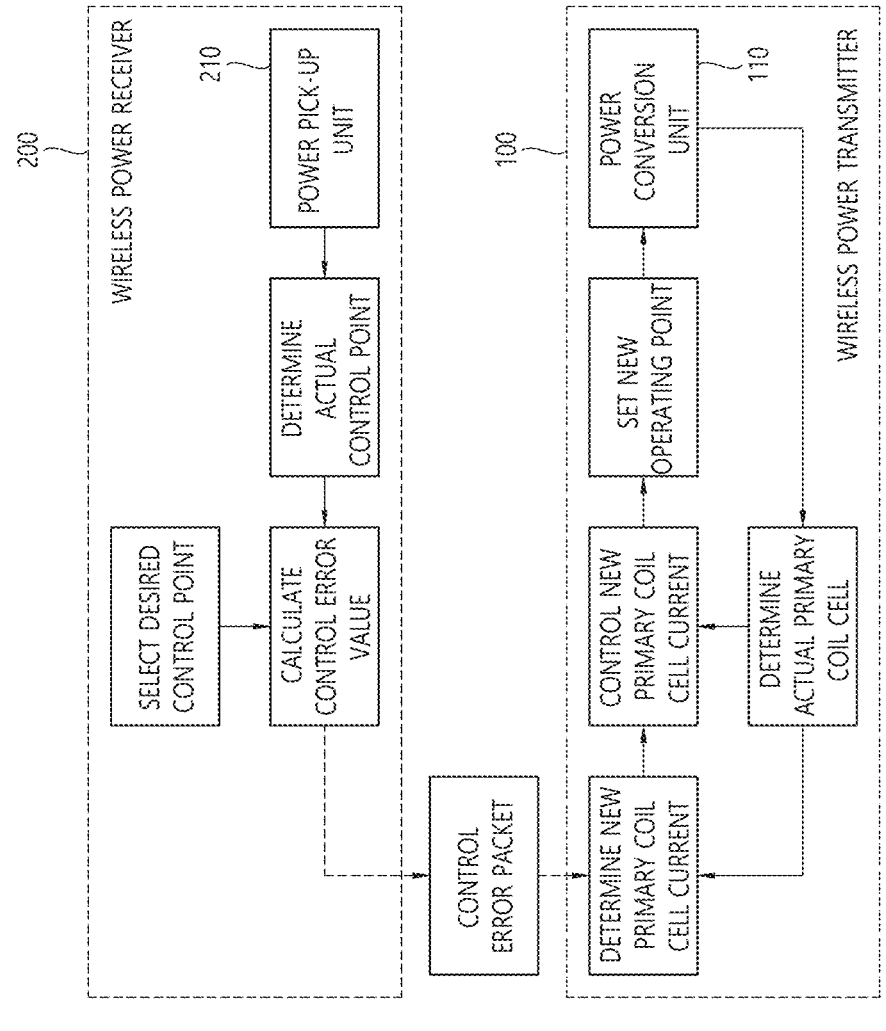
FIG. 6 illustrates a power control method according to one embodiment.

FIG. 6 illustrates a power control method according to one embodiment.

Referring to FIG. 6, in the power transfer phase, the wireless power transmitter 100 and the wireless power receiver 200 may control the amount of power transferred by performing power transfer and communication at the same time. The wireless power transmitter and the wireless power receiver operate at a specific control point. The control point represents a combination of voltage and current provided at the output of the wireless power receiver when power transfer is performed.

To describe in more detail, the wireless power receiver selects a desired control point—desired output current/voltage, temperature at a specific position on a mobile device, and so on—and additionally determines an actual control point currently operating. The wireless power receiver may calculate a control error value by using the desired control point and the actual control point and transmit the calculated control error value to the wireless power transmitted through a control error packet.

And the wireless power transmitter may configure/control a new operating point—amplitude, frequency, and duty cycle—and control power transfer by using the received control error packet. Therefore, the control error packet is transmitted/received at regular time intervals in the power transfer phase, and as an embodiment, if the wireless power receiver attempts to reduce the current of the wireless power transmitter, the wireless power receiver may transmit the control error value by setting the control error value to a negative value while, if the wireless power receiver attempts to increase the current, the control error value may be transmitted after being set to a positive value. In this way, in the induction mode, the wireless power receiver may control power transfer by transmitting the control error packet to the wireless power transmitter.

In the resonance mode to be described below, power transfer may be conducted differently from the induction mode. In the resonance mode, one wireless power transmitter should be able to serve a plurality of wireless power receivers simultaneously. However, when power transfer is controlled as in the induction mode, since transferred power is controlled by communication with one wireless power receiver, it may be difficult to control power transfer for additional wireless power receivers. Therefore, in the resonance mode according to the present disclosure, a wireless power transmitter transmits basic power commonly to wireless power receivers, and a wireless power receiver may control the amount of received power by controlling its own resonant frequency. However, even in the resonance mode, the method described with reference to FIG. 6 is not completely excluded; rather, control of additional transmission power may be performed according to the method of FIG. 6.

Figure 7:
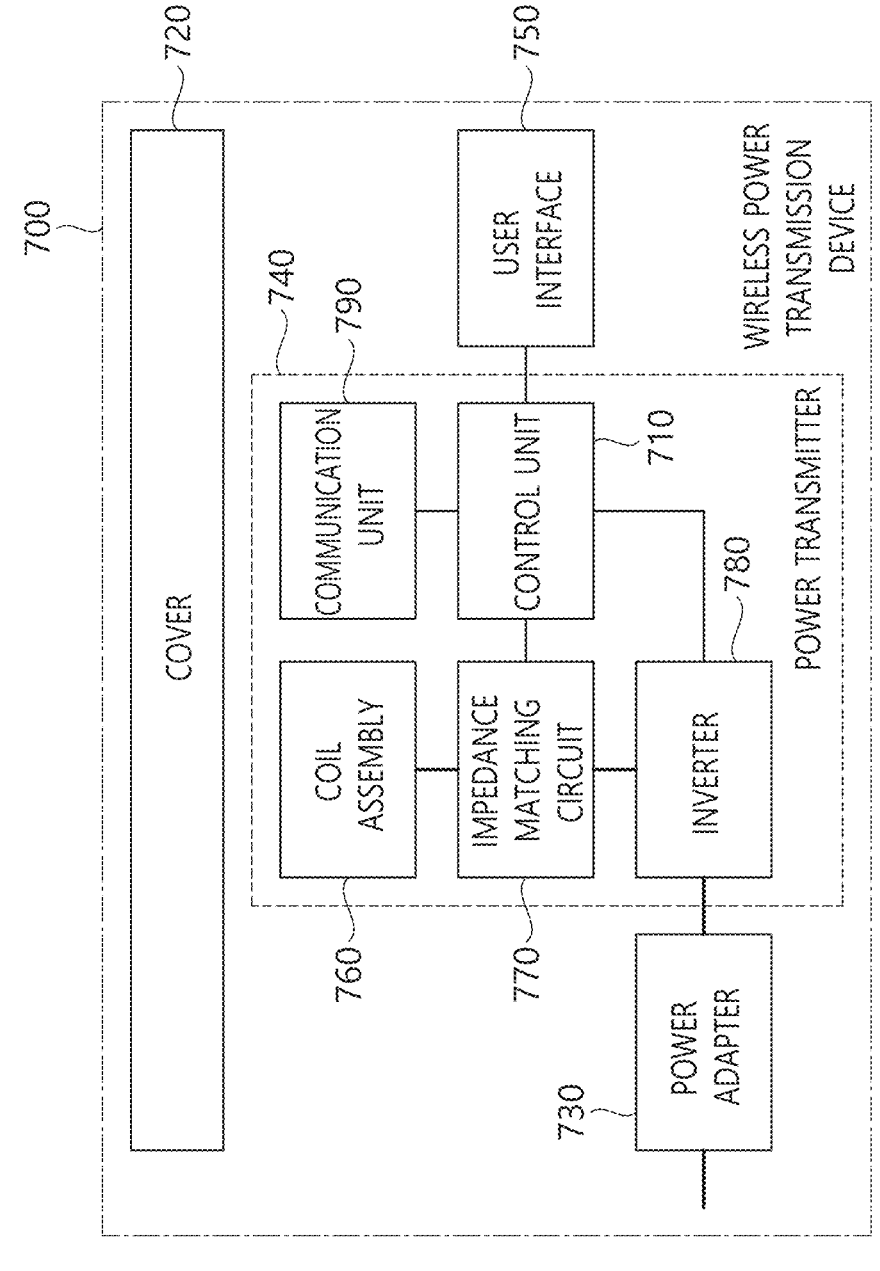
FIG. 7 illustrates a block diagram of a wireless power transmitter according to another embodiment.

FIG. 7 illustrates a block diagram of a wireless power transmitter according to another embodiment. The block diagram may belong to a wireless power transmission system in the magnetic resonance method or shared mode. The shared mode may refer to a mode in which wireless power transmitters and receivers perform one-to-many communication and charging. The shared mode may be implemented by using the magnetic induction method or resonance method.

Referring to FIG. 7, the wireless power transmitter 700 may include at least one of a cover 720 covering a coil assembly, power adaptor 730 supplying power to a power transmitter 740, power transmitter 740 transmitting wireless power, or user interface 750 providing information about progress of power transfer and other related matters. In particular, the user interface 750 may be optionally included or included as another user interface 750 of the wireless power transmitter (700).

The power transmitter 740 may include at least one of a coil assembly 760, impedance matching circuit 770, inverter 780, communication unit 790, or control unit 710.

The coil assembly 760 includes at least one primary coil generating a magnetic field and may be referred to as a coil cell.

The impedance matching circuit 770 provides impedance matching between the inverter 780 and the primary coil(s). The impedance matching circuit 770 may generate resonance at a frequency suitable for boosting the primary coil current. In the multi-coil power transmitter 740, the impedance matching circuit may additionally include a multiplexer which routes a signal to a subset of the primary coils at the inverter 780. The impedance matching circuit 770 may also be referred to as a tank circuit.

The impedance matching circuit 770 may include capacitors, inductors, and switching elements that switch connections among capacitors and inductors. Matching of impedance may be performed by detecting a reflected wave of wireless power transmitted through the coil assembly 760 and adjusting a connected state of a capacitor or an inductor by switching the switching element based on the reflected wave or by adjusting capacitance of a capacitor or by adjusting inductance of an inductor. Depending on the needs, the impedance matching circuit 770 may be omitted, and the present specification also includes an embodiment of the wireless power transmitter 700 in which the impedance matching circuit 770 is omitted.

For example, the impedance matching circuit 770 may be constructed of four inverters for power conversion for each coil, and may receive a PWM signal from the control unit 710. The impedance matching circuit 770 is driven by transferring a signal to the inverter through two 4-channel logic switches.

The inverter 780 may convert an DC input to an AC signal. The inverter 780 may be driven in a half-bridge or full-bridge structure to generate a pulse wave and duty cycle of an adjustable frequency. Also, the inverter may include a plurality of stages to adjust an input voltage level.

The communication unit 790 may perform communication with a power receiver. The power receiver performs load modulation to communicate a request and information with a power transmitter. Therefore, the power transmitter 740 may monitor amplitude and/or phase of a current and/or voltage of the primary coil by using the communication unit 790 to demodulate data transmitted from the power receiver.

The communication unit 790 may include any one or both of the in-band communication module and the out-band communication module. The communication unit 790 is configured to search for a wireless power receiving device 800 or perform data transmission to the wireless power receiving device 800. Herein, the communication unit 790 may be configured to perform a procedure related to authentication of the wireless power receiving device 800. Herein, the authentication includes Qi authentication. For example, the communication unit 790 may receive authentication-related information from the wireless power receiving device 800 or transmit it to the wireless power receiving device 800.

Also, the power transmitter 740 may control output power to transmit data through the communication unit 790 by using the Frequency Shift Keying (FSK) scheme.

The control unit 710 may control communication and power transfer of the power transmitter 740. The control unit 710 may control power transfer by adjusting the aforementioned operating point. The operating point may be determined, for example, by at least one of the operating frequency, duty cycle, and input voltage.

The communication unit 790 and control unit 710 may be implemented by separate units/elements/chipsets or by a single unit/element/chipset.

Figure 8:
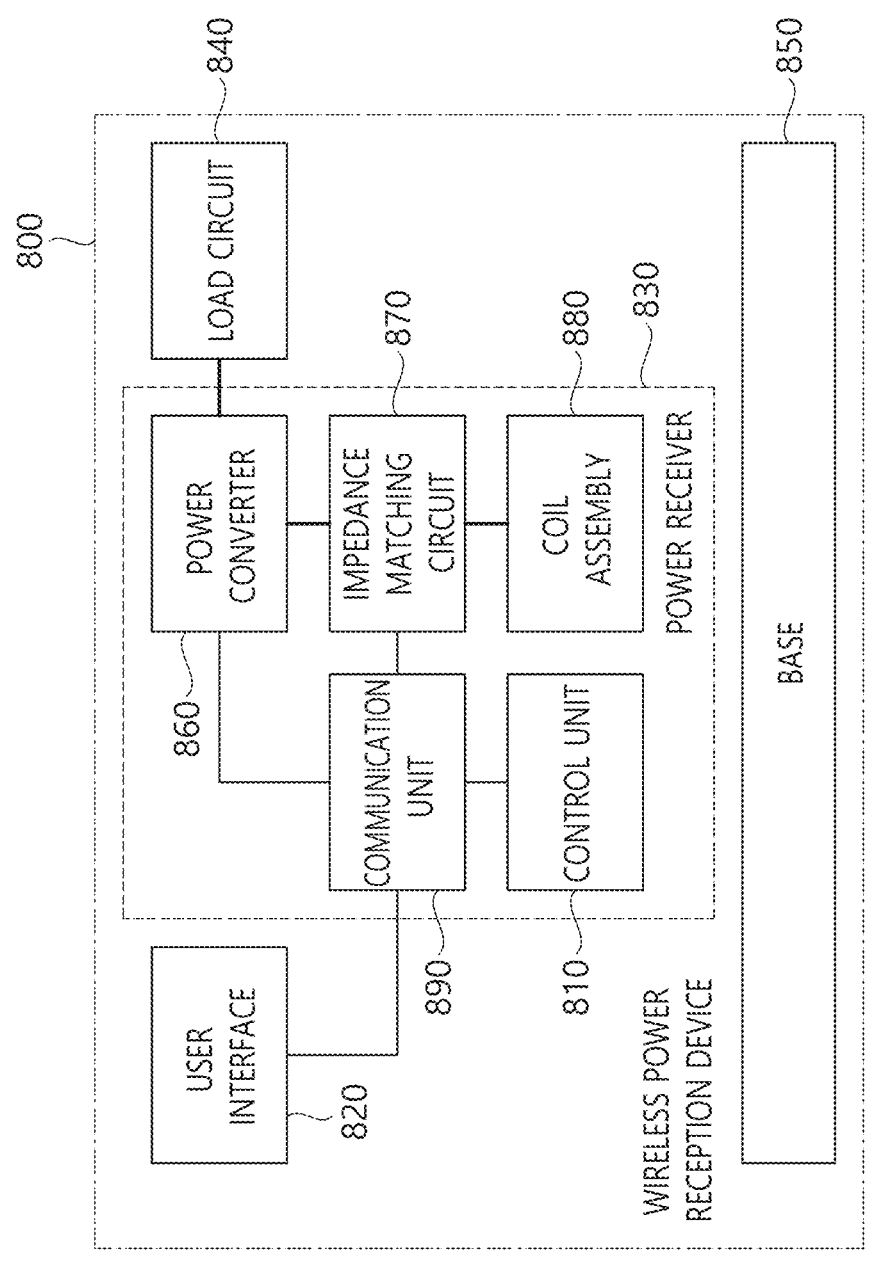
FIG. 8 illustrates a block diagram of a wireless power receiver according to another embodiment.

FIG. 8 illustrates a block diagram of a wireless power receiver according to another embodiment. The block diagram may belong to a wireless power transmission system in the magnetic resonance method or shared mode.

In FIG. 8, the wireless power receiver 800 may include at least one of a user interface 820 providing information about progress of power transfer and other related matters; power receiver 830 receiving wireless power; and base 850 supporting and covering a load circuit 840 or coil assembly. In particular, the user interface 820 may be optionally included or included as another user interface 820 of power reception equipment.

The power receiver 830 may include at least one of a power converter 860, impedance matching circuit 870, coil assembly 880, communication unit 890, or control unit 810.

The power converter 860 may convert AC power received from the secondary coil into voltage and current suitable for the load circuit. As an embodiment, the power converter 860 may include a rectifier. The rectifier rectifies received wireless power and converts an AC signal to a DC signal. The rectifier may convert an AC signal to a DC signal by using a diode or transistor and smooth the converted signal by using a set of capacitors and resistors. Rectifiers may be implemented by using full-wave rectification based on a bridge circuit, half-wave rectification, or voltage multiplication. In addition, the power converter may adapt to the reflected impedance of the power receiver.

The impedance matching circuit 870 may provide impedance matching between a combination of the power converter 860 and the load circuit 840 and the secondary coil. As an embodiment, the impedance matching circuit may generate resonance around 100 kHz which may reinforce power transfer. The impedance matching circuit 870 may include capacitors, inductors, and switching elements that switch between combinations thereof. Matching of impedance may be performed by controlling switching elements constituting the impedance matching circuit 870 based on the voltage, current, power, and frequency value of received wireless power. Alternatively, the impedance matching circuit 870 may be constructed of four inverters for power conversion for each coil, and may receive a PWM signal from the control unit 810. The impedance matching circuit 870 is driven by transferring a signal to the inverter through two 4-channel logic switches.

Depending on the needs, the impedance matching circuit 870 may be omitted, and the present specification also includes an embodiment of the wireless power receiver 200 in which the impedance matching circuit 870 is omitted.

The coil assembly 880 may include at least one secondary coil and optionally further include an element which shields a metallic part of the receiver against a magnetic field.

The communication unit (890) may perform load modulation in order to communicate requests and other information to the power transmitter. For this, the power receiver (830) may perform switching of the resistance or capacitor so as to change the reflected impedance.

The communication unit 890 may include any one or both of the in-band communication module and the out-band communication module. The communication unit 890 is configured to search for the wireless power transmitting device 700 or perform data transmission to the wireless power transmitting device 700. Herein, the communication unit 890 may be configured to perform a procedure related to authentication of the wireless power transmitting device 700. Herein, the authentication includes Qi authentication. For example, the communication unit 890 may receive authentication-related information from the wireless power transmitting device 700 or transmit it to the wireless power transmitting device 700.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed. The control unit 710 may be configured to perform a procedure related to authentication of the wireless power transmitting device 700. Herein, the authentication includes Qi authentication.

The communication unit 890 and control unit 810 may be implemented by separate units/elements/chipsets or by a single unit/element/chipset.

Figure 9:
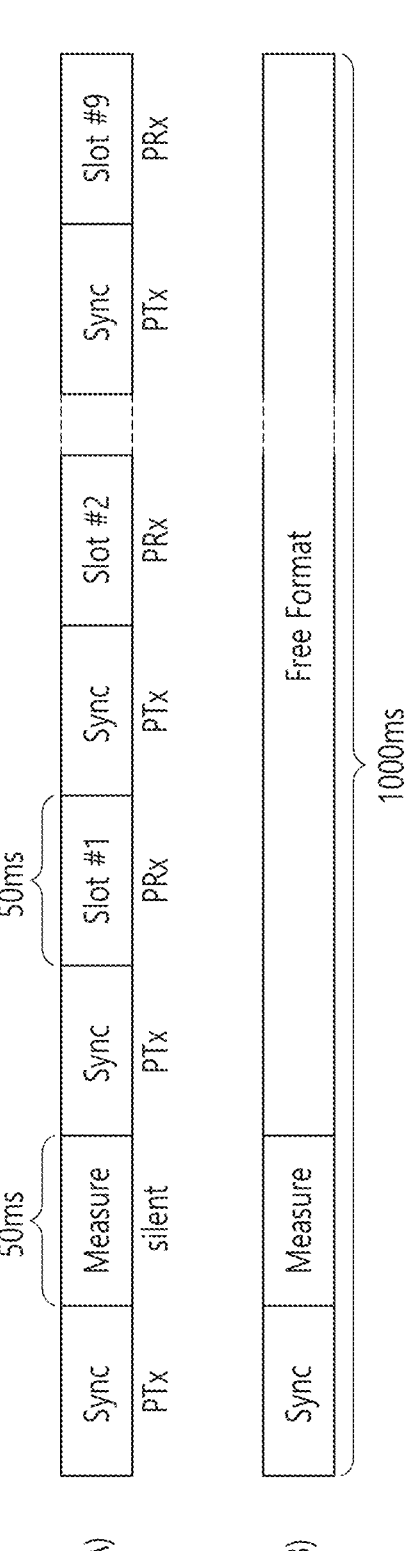
FIG. 9 illustrates a communication frame structure according to one embodiment.

FIG. 9 illustrates a communication frame structure according to one embodiment. This frame structure may be a communication frame structure in the shared mode.

Referring to FIG. 9, in the shared mode, different types of frames may be used together. For example, in the shared mode, a slotted frame having a plurality of slots as shown in (A) and a free format frame without a specific frame as shown in (B) may be used. More specifically, the slotted frame is intended for a wireless power receiver 200 to transmit short data packets to a wireless power transmitter 100, and the free format frame does not have a plurality of slots, thereby allowing transmission of long data packets.

Meanwhile, the slotted frame and free format frame may be changed to various names by those skilled in the art. For example, the slotted frame may be called a channel frame, and the free format frame may be called a message frame.

More specifically, the slotted frame may include a sync pattern indicating the start of a slot, measurement slot, nine slots, and an additional sync pattern having the same time interval before each of the nine slots.

Here, the additional sync pattern is different from the sync pattern indicating the start of the frame described above.

More specifically, the additional sync pattern does not indicate the start of the frame but shows information related to adjacent slots (namely, two consecutive slots placed at both sides of the sync pattern).

A sync pattern may be located between any two consecutive slots of the nine slots. In this case, the sync pattern may provide information related to the two consecutive slots.

Also, the nine slots and sync patterns provided before the respective nine slots may have the same time interval. For example, the nine slots may have a time interval of 50 ms. Also, the nine sync patterns may have a time length of 50 ms.

Meanwhile, the free format frame as shown in (B) may not have a specific form except for the sync pattern indicating the start of the frame and the measurement slot. In other words, the free format frame is intended to perform a role different from that of the slotted frame; for example, the free format frame may be used for performing communication of long data packets (for example, additional owner information packets) between a wireless power transmitter and a wireless power receiver or for selecting any one from among a plurality of coils in a wireless power transmitter composed of the plurality of coils.

In what follows, a sync pattern included in each frame will be described in more detail with reference to a related figure.

FIG. 10 illustrates a structure of a sync pattern according to one embodiment.

Referring to FIG. 10, a sync pattern may be composed of a preamble, start bit, response field, type field, info field, and parity bit. In FIG. 10, the start bit is set to ZERO.

More specifically, a preamble is composed of consecutive bits which may all be set to 0s. In other words, the preamble may be composed of bits to conform to the time length of a sync pattern.

The number of bits constituting the preamble may depend on the operating frequency in a way that the length of the sync pattern is closest to 50 ms but does not exceed 50 ms. For example, if the operating frequency is 100 kHz, the sync pattern may comprise two preamble bits while, if the operating frequency is 105 kHz, the sync pattern may comprise three preamble bits.

The start bit is a bit following the preamble and may be set to ZERO. The ZERO may be a bit indicating the type of the sync pattern. Here, the type of sync pattern may include a frame sync including information related to the frame and a slot sync including information about the slot. In other words, the sync pattern may be a frame sync which is located between consecutive frames and indicates the start of the frame or a slot sync which is located between consecutive slots among a plurality of slots constituting the frame and includes information related to the consecutive slots.

For example, if the ZERO is 0, it indicates a slot sync where the corresponding sync is located between slots while, if the ZERO is 1, it indicates a frame sync where the corresponding sync pattern is located between frames.

The parity bit is the last bit of the sync pattern and indicates the number of bits constituting data fields (namely, response field, type field, and information field) of the sync pattern. For example, the parity bit is 1 when the number of bits constituting data fields of the sync pattern is even and 0, otherwise (namely, when it is odd).

The response field may include response information of a wireless power transmitter with respect to communication with a wireless power receiver within the slot before the sync pattern. For example, the response field may be '00' if communication with the wireless power receiver is not detected. Similarly, the response field may be '01' if a communication error is detected in communication with the wireless power receiver. The communication error may indicate a case in which two or more wireless power receivers attempt to approach one slot and two or more wireless power receivers collide with each other.

Also, the response field may include information indicating whether a data packet has been received correctly from the wireless power receiver. More specifically, the response field may be "10" (10—not acknowledge (NAK)) when the wireless power transmitter denies a data packet while it may be "11" (11-acknowledge (ACK)) when the wireless power transmitter confirms the data packet.

The type field may indicate the type of a sync pattern. More specifically, the type field may be '1' to indicate a frame sync if the sync pattern is the first sync pattern of a frame (namely, the first sync pattern of the frame when the sync pattern is located before the measurement slot).

Also, the type field may be '0' to indicate a slot sync if the sync pattern is not the first sync pattern of the frame.

Also, the meaning of the information field may be determined according to the type of sync pattern indicated by the type field. For example, if the type field is 1 (namely in the case of frame sync), the meaning of the info field may indicate the type of a frame. In other words, the info field may indicate whether a current frame is a slotted frame or free-format frame. For example, if the info field is '00', it may indicate a slotted frame while, if the info field is '01', it may indicate a free-format frame.

Unlike the above, if the type field is 0 (namely in the case of slot sync), the info field may indicate the state of the next slot located behind the sync pattern. More specifically, the info field is '00' if the next slot is a slot allocated to a specific wireless power receiver; '01' if the next slot is a slot locked to be used temporarily by a specific wireless power receiver; or '10' if the next slot is a slot freely available for an arbitrary wireless power receiver.

Figure 11:
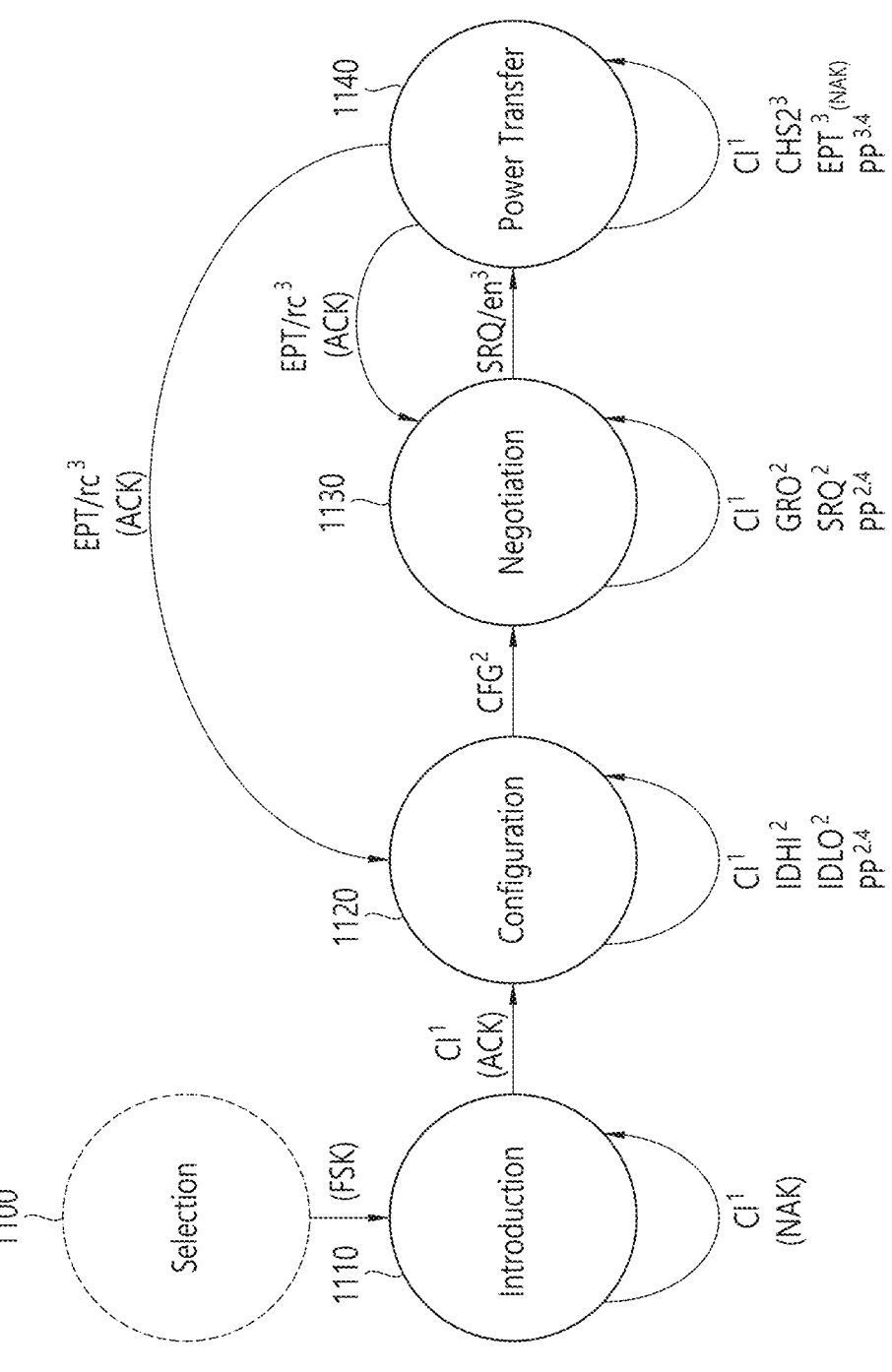
FIG. 11 illustrates operation states of a wireless power transmitter and a wireless power receiver in a shared mode according to one embodiment.

FIG. 11 illustrates operation states of a wireless power transmitter and a wireless power receiver in a shared mode according to one embodiment.

Referring to FIG. 11, a wireless power receiver operating in the shared mode may operate in one of selection phase 1100, introduction phase 1110, configuration phase 1120, negotiation phase 1130, and power transfer phase 1140.

First, a wireless power transmitter according to one embodiment may transmit a wireless power signal to detect a wireless power receiver. In other words, a process of detecting a wireless power receiver by using a wireless power signal may be called analog ping.

Meanwhile, the wireless power receiver which has received a wireless power signal may enter the selection phase 1100. The wireless power receiver which has entered the selection phase 1100 may detect existence of an FSK signal on the wireless power signal as described above.

In other words, the wireless power receiver may perform communication via either exclusive mode or shared mode depending on existence of the FSK signal.

More specifically, the wireless power receiver may operate in the shared mode if an FSK signal is included in a wireless power signal and otherwise operate in the exclusive mode.

If the wireless power receiver operates in the shared mode, the wireless power receiver may enter the introduction phase 1110. In the introduction phase 1110, the wireless power receiver may transmit a control information (CI) packet to the wireless power transmitter to transmit the CI packet in the configuration phase, negotiation phase, and power transfer phase. The control information packet may have a header and information related to control. For example, the header of the control information packet may be 0X53.

In the introduction state 1110, the wireless power receiver performs an attempt for requesting a free slot to transmit a CI packet throughout the subsequent configuration, negotiation, and power transfer phase. At this time, the wireless power receiver selects a free slot and transmits an initial CI packet. If the wireless power transmitter responds to the corresponding CI with ACK, the wireless power transmitter enters the configuration phase. If the wireless power transmitter responds with NACK, it indicates that other wireless power receiver is under progress through the configuration and negotiation phase. In this case, the wireless power receiver re-attempts to request a free slot.

If the wireless power receiver receives ACK as a response to the CI packet, the wireless power receiver determines the location of a private slot within the frame by counting the remaining slot syncs up to the initial frame sync. In all subsequent slot based frames, the wireless power receiver transmits the CI packet through the corresponding slot.

If the wireless power transmitter allows the wireless power receiver to proceed to the configuration phase, the wireless power transmitter provides a locked slot series for an exclusive use of the wireless power receiver. This ensures that the wireless power receive proceed to the configuration phase without collision.

The wireless power receiver transmits sequences of data packets such as two identification data packets (IDHI and IDLO) by using a locked slot. After completing the present phase, the wireless power receiver enters the negotiation phase. In the negotiation phase, the wireless power transmitter continues to provide a locked slot to the wireless power receiver for an exclusive use. This ensures that the wireless power receiver proceeds the negotiation phase without collision.

The wireless power receiver may transmit one or more negotiation data packets by using the corresponding locked slot, which may be mixed with private data packets. As a result, the corresponding sequence is terminated together with a specific request (SRQ) packet. If the corresponding sequence is completed, the wireless power receiver enters the power transfer phase, and the wireless power transmitter stops providing a locked slot.

In the power transfer state, the wireless power receiver performs transmission of a CI packet and receives power by using an allocated slot. The wireless power receiver may include a regulator circuit. The regulator circuit may be included in the communication/control unit. The wireless power receiver may self-regulate the reflected impedance of the wireless power receiver through the regulator circuit. In other words, the wireless power receiver may adjust reflected impedance to transmit the amount of power requested by an external load. This may prevent reception of excessive power and overheating.

In the shared mode, since the wireless power transmitter may not perform adjusting power in response to a received CI packet (depending on the operating mode), control may be necessary to prevent an overvoltage state.

In what follows, the switching operation between in-band communication and out-of-band communication is referred to as handover. In particular, an operation that a wireless power transfer device and a wireless power receiver switch from in-band communication to out-of-band communication is referred to as handover to out-band, and a switching operation from out-of-band communication to in-band communication is referred to as handover to in-band. Out-band communication may include, for example, Bluetooth or Bluetooth Low Energy (BLE) or NFC. A handover connection procedure may include a procedure for establishing a connection of out-band communication when an out-band communication (i.e., BLE) module receives a handover message from an in-band communication module. Here, the handover message may be a message from an in-band communication module (or controller), which instructs an out-band communication module to initiate a wireless connection for exchanging information related to wireless power transfer.

For out-band communication to be applied to a wireless power transfer system, the out-band communication needs to be modified according to the inherent characteristics of the wireless power transfer system. For example, considering the characteristics of the information exchanged between a wireless power transfer device and a wireless power receiver (for example, whether it is urgent information, whether it is transmitted only when a state is changed, or whether a large amount of information needs to be exchanged in a short time), a message type, a message format, and procedures according to the existing out-band communication have to be redesigned. Various wireless power applications may be supported by defining configuration information, control information, and management information related to the wireless power transfer; and procedures for exchanging the information as an out-band communication protocol.

In what follows, the present disclosure will be described by taking BLE as out-band communication. However, in the embodiments based on BLE, it should be obvious to those skilled in the art that those embodiments in which other out-band communication substitutes for BLE also implement the technical spirit of the present embodiment.

Figure 12:
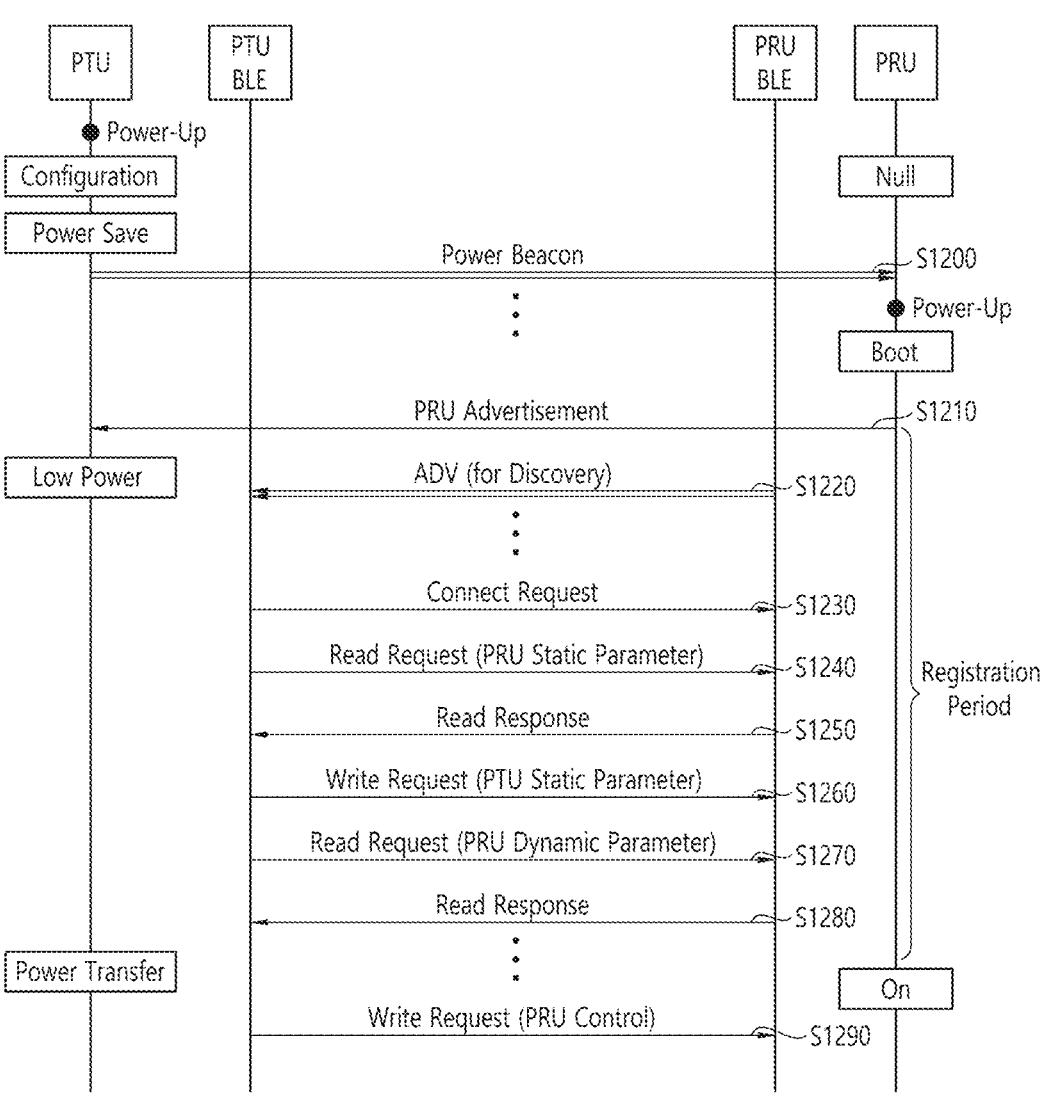
FIG. 12 is a flowchart illustrating a method in which a wireless power transmitter and a wireless power receiver exchange information related to wireless charging in an out-band or in-band manner according to an embodiment.
Figure 13:
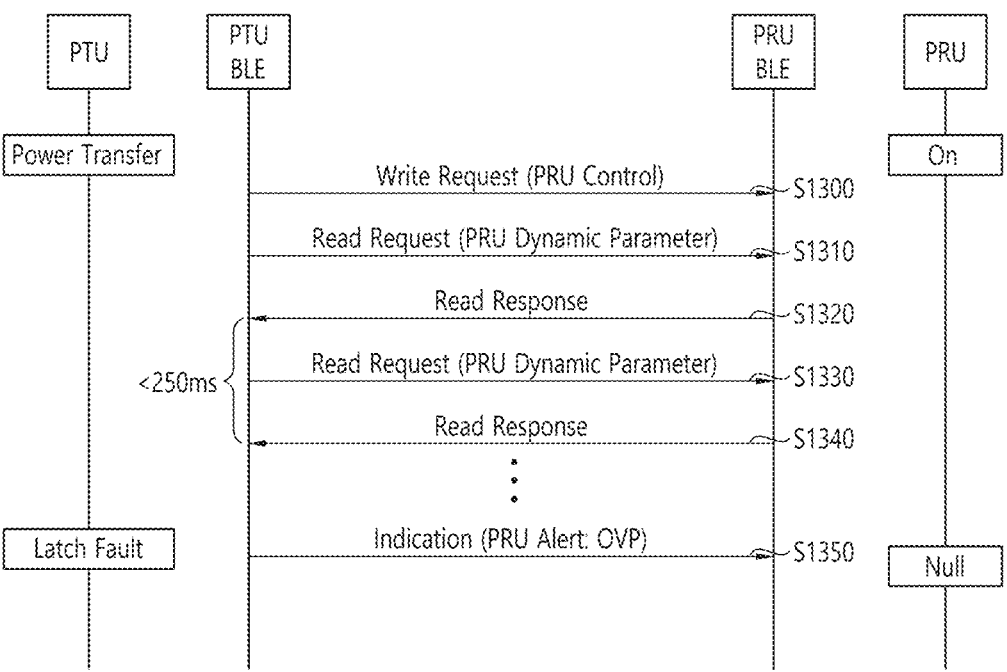
FIG. 13 is a flowchart illustrating a method in which a wireless power receiver notifies a wireless power transmitter of an error according to an embodiment.

FIG. 12 is a flowchart illustrating a method in which a wireless power transmitter and a wireless power receiver exchange information related to wireless charging in an out-band or in-band manner according to an embodiment, and FIG. 13 is a flowchart illustrating a method in which a wireless power receiver notifies a wireless power transmitter of an error according to an embodiment.

In FIG. 12 and FIG. 13, a PTU means a power transfer unit, and a PRU means a power receiving unit. An information transmission method of FIG. 12 and FIG. 13 may be a method based on an alliance for wireless power (A4WP) or AFA standard technique.

First, referring to FIG. 12, when the PTU is powered on, the PTU enters a power-save state via a configuration state which is an initial configuration state.

In the power-save state, the PTU transmits a power beacon to the PRU (S1200). The power-save state is kept continuously until the PTU receives an advertisement from the PRU.

When the PRU is powered on and booted, the PRU sends a PRU advertisement (S1210). The PRU which receives the PRU advertisement enters a low power state.

In the low power state, when a BLE module of the PTU receives an advertising packet (ADV) for discovery from a BLE module of the PRU (S1220), a connect request is transmitted to the PRU to establish a BLE connection with the PRU (S1230).

In a state in which BLE communication is possible between the PTU and the PRU, the PTU reads a PRU static parameter of the PRU through read request and read response messages (S1240, S1250). Herein, the PRU static parameter includes state information of the PRU.

In addition, the PRU transfers PTU static parameter information containing capabilities information of the PTU to the PRU through a write request message (S1260).

After exchanging the static parameter information, the PTU periodically receives PRU dynamic parameter information measured in the PRU through a read request and a read response (S1270, S1280). Herein, the PRU dynamic parameter includes voltage information, current information, temperature information, or the like.

When the PRU notifies the PRU that charging is to be performed or controls permission of the PRU, the PRU may perform a PRU control by using the write request (S1290).

Referring to FIG. 13, the PRU may control the PTU through the write request in a power transfer state (S1300). In addition, the PRU dynamic parameter may be received from the PRU through the read request message and the read response message (S1310 to S1340). The PTU may obtain the PRU dynamic parameter with a period of 250 ms.

When an error such as over voltage protection (OVP) is detected while the above operation is repeated, the PTU transmits a PRU alert to the PTU through an indication message (S1350). Upon receiving the indication message including the PRU alert, the PTU is in a latch fault state.

Figure 14:
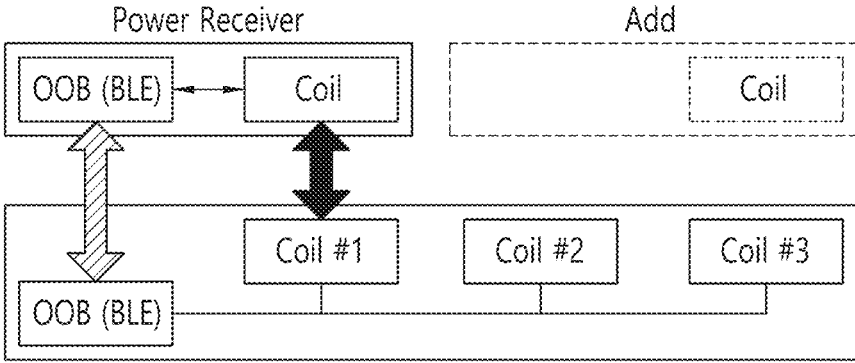
FIG. 14 illustrates a situation in which a wireless power transmitter additionally supplies wireless power to a new wireless power receiver while transmitting wireless power to a wireless power receiver.
Figure 15:
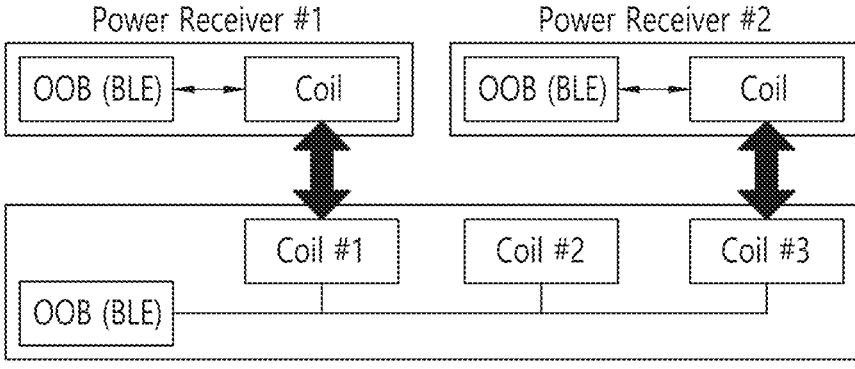
FIG. 15 illustrates a situation in which a wireless power transmitter changes (increases or decreases) power supplied to a wireless power receiver while transmitting wireless power to a plurality of wireless power receivers.

FIG. 14 illustrates a situation in which a wireless power transmitter additionally supplies wireless power to a new wireless power receiver while transmitting wireless power to a wireless power receiver, and FIG. 15 illustrates a situation in which a wireless power transmitter changes (increases or decreases) power supplied to a wireless power receiver while transmitting wireless power to a plurality of wireless power receivers.

As shown in FIG. 14 and FIG. 15, during the wireless power transmitter and the wireless power receiver transmit wireless power in a 1:1 manner or in a situation where one wireless power transmitter transmits wireless power to a plurality of wireless power receivers, if a protocol in which a power transmission negotiation is initiated by the wireless power transmitter is used, one wireless power transmitter shall perform communication for a power negotiation with the plurality of wireless power receivers. Therefore, in order to implement this with in-band communication, that is, communication using a primary coil and a secondary coil, a protocol becomes complex in order to avoid a collision between packets transmitted from respective wireless power receivers.

In addition, in a situation in which the wireless power transmitter shall transmit power to a wireless power receiver which is in a power-off state, it is necessary to define how the wireless power receiver operates an OOB module and performs out-band communication. For example, when the wireless power receiver in the power-off state is placed on the wireless power transmitter, the wireless power receiver may drive an operating system (OS) or may enable only a wireless charging module without having to drive the OS. In the latter case, it is not that disabled Bluetooth is enabled. Therefore, in case of the wireless power receiver in which only the wireless changing module is enabled in the power-off state, it is difficult to negotiate for transmission power using OOB.

Hereinafter, in order to solve the aforementioned problems, a scan rule and scan procedure used in wireless changing for out-band communication, a mode for reporting a scan result, a message and parameter used in the scan procedure will be described in detail. Herein, the scan rule is to determine which device will perform the scan between the wireless power transmitter and at least one of the wireless power receivers. Components and features necessary to describe the present disclosure are summarized for each category as shown in Table 4 below.

TABLE 4

| Category | Description |
|----------|-------------|
| Mode | a state in which a device is set to perform a specific operation |
| Procedure | a series of procedures to be performed by a device to perform a specific function |
| Message | an operation for transferring a parameter between devices |
| Parameter | a data value transferred to a peer device through a message or a setting value of a device |

Figure 16:
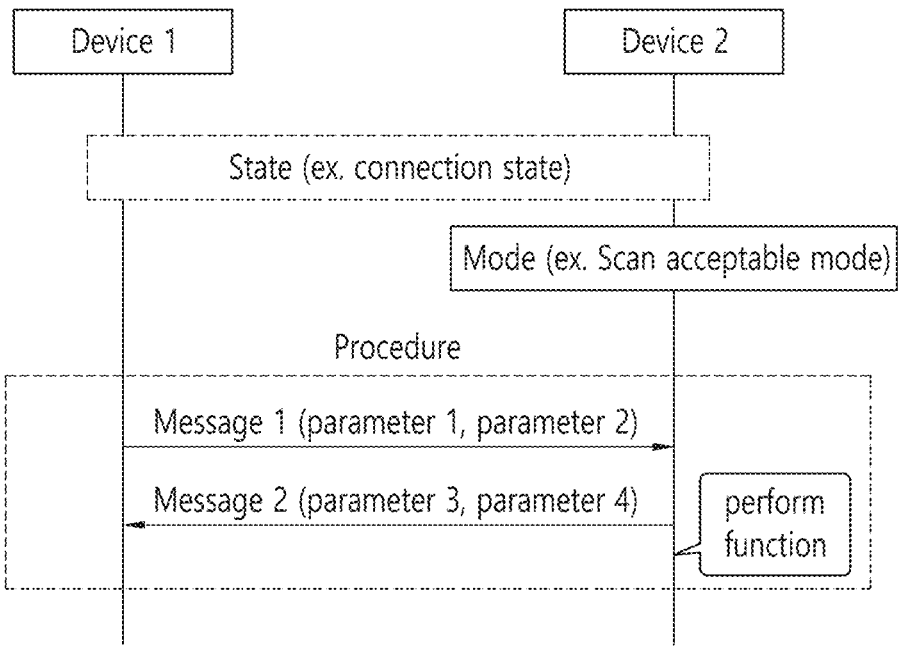
FIG. 16 is a drawing for describing terms used in the present disclosure.

FIG. 16 is a drawing for describing terms used in the present disclosure.

Throughout a power transmission procedure and communication procedure, it is specified in the present embodiment that a wireless power transmitter and a wireless power receiver operate according to the procedure of FIG. 16.

Referring to FIG. 16, a first device and a second device operate in a specific state. For example, the specific state may include a connection state. Herein, the connection state may mean a state in which a communication link is established between the first device and the second device. In this case, the first device may be a wireless power transmitter, and the second device may be a wireless power receiver. Alternatively, the first device may be a wireless power receiver, and the second device may be a wireless power transmitter.

Alternatively, the first device may be a first wireless power receiver, and the second device may be a second wireless power receiver.

In the first state, the first device or the second device enters a specific mode. Herein, the specific mode may include a selection mode, an identification and configuration mode, a negotiation mode, a correction mode, a power transmission mode, a scan acceptable mode, or the like. That is, in FIG. 5 and FIG. 11, each phase may be called a mode.

In the specific mode, a procedure for performing a specific function of wireless power transmission or communication may be performed between the first device and the second device. For example, the procedure may include an operation of exchanging the first message and the second message. Each message may include parameters which are intended to be transmitted to a peer device by the wireless power transmitter or the wireless power receiver.

Names of features and components of the present disclosure, a category (procedure/phase/message/parameter) thereof, and content and descriptions of operations are summarized as follows, based on Table 4 and FIG. 16.

TABLE 5

| Name | Category | Description |
|------|----------|-------------|
| Bluetooth/ Device ID | Parameter | An ID given to an OOB (BLE) module or device itself (Ex: Bluetooth MAC Address, Device Serial Number, ...) |
| OOB Enable Capability Check | Message | A message exchanged between a control unit and an OOB (BLE) module (see 6.3 block diagram), including a parameter indicating a current state of the OOB and whether the OOB can be enabled. |
| Power Allocation Negotiation | Procedure | A procedure of negotiating for a power level to perform wireless changing between PRx devices and a PTx device. In this procedure, a message such as START & Offer & Result is exchanged. There are |

TABLE 5-continued

| Name | Category | Description |
|------|----------|-------------|
| | | a method capable of negotiating with the PRx after performing a power negotiation preferentially through communication between the PRx devices, and a method of performing a power negotiation while each PRx and the PRx perform communication. |
| START & Offer & Result | Message | START is a message for informing other devices of a start of a power allocation negotiation by a device, which is either PRx or PRx, intending to start the transmission power negotiation. Offer is a message used when the PRx proposes its request power to the PTx. Result is a message used when a negotiation result obtained finally in the power allocation negotiation is informed by the PRx to the PRx or by the PRx to the PRx. |
| Power Allocation Information Exchange | Mode | A mode in which communication is possible between PRxs to exchange, in advance, power information required between the PRxs. In this mode, the PRx negotiates by exchanging power information mutually re-quired, and informs the PRx of a result thereof. |
| Nego Priority | Parameter | A parameter which specifies a value for a priority, when a power change is requested. |

Hereinafter, each embodiment is disclosed in detail based on Table 5 above.

Figure 17:
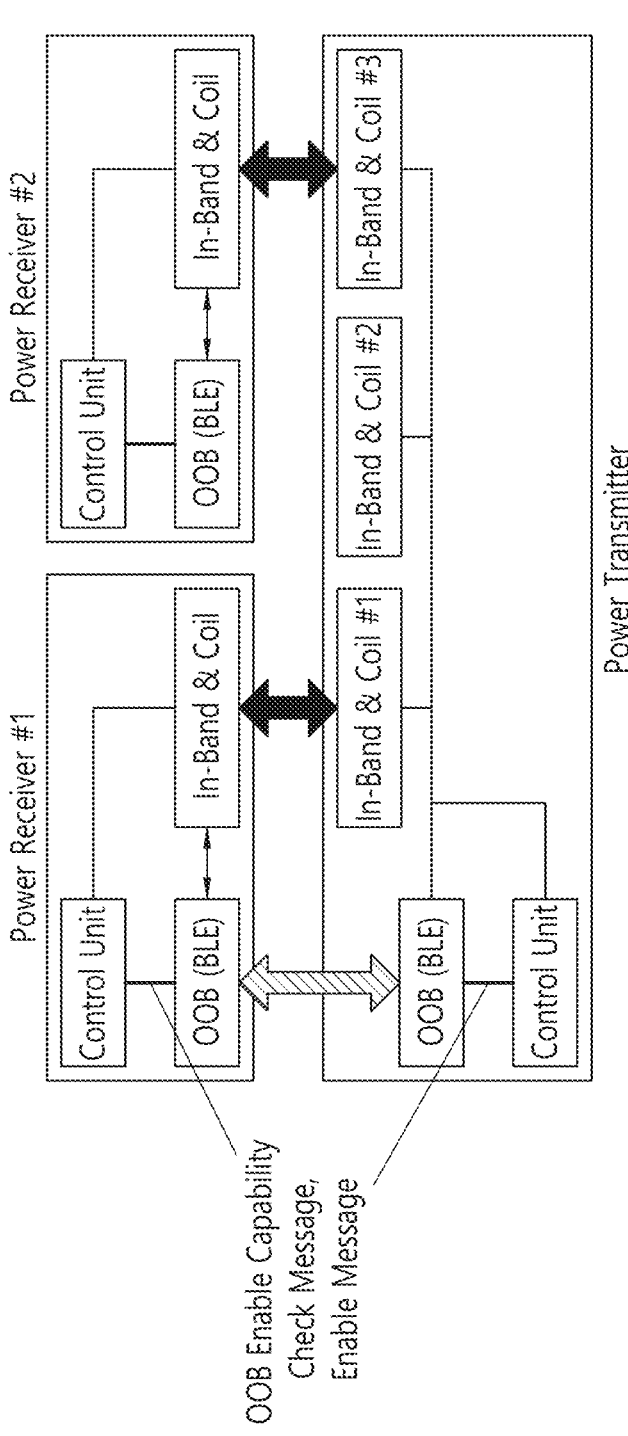
FIG. 17 is an internal block diagram of a wireless power transmitter and a wireless power receiver according to an embodiment.

FIG. 17 is an internal block diagram of a wireless power transmitter and a wireless power receiver according to an embodiment.

Referring to FIG. 17, each of the wireless power receiver and the wireless power transmitter includes an out-of-band (OOB) communication module, an in-band communication module, a coil (or antenna) for wireless power transmission or reception, and a control unit.

The OOB communication module and the in-band communication module are coupled with each other to mutually perform wired communication. The OOB communication module may store device-specific information or OOB-related ID or may provide it to a control unit of a corresponding device.

The wireless power transmitter may include a plurality of coils #1 to 3, and each coil may be identified and distinguished by information on a position, a disposition, and a coil ID.

Information owned or obtained by the OOB communication module and information owned or obtained by the in-band communication module may be configured with a format and an interface so as to be exchanged through internal wired communication.

The control unit of the wireless power transmitter or wireless power receiver controls an operation of the OOB communication module, in-band communication module, and coil. In an aspect, the control unit is configured to obtain information from the in-band communication module and the coil, and to control the OOB communication module (or function) to be enabled/disabled based on the obtained information.

For example, the control unit of the wireless power transmitter or wireless power receiver may exchange an OOB enable capability check message with the OOB communication module to recognize a current state of the OOB communication module (or function) or to determine whether the OOB communication module (or function) of the wireless power receiver can be enabled even in a power-off state. In addition, the control unit of the wireless power transmitter or wireless power receiver may indicate or control an enable/disable operation of the OOB communication module (or function) through an enable message.

The wireless power transmitter in the embodiment of FIG. 17 corresponds to the wireless power transmitter or wireless power transmitter or power transfer unit disclosed in FIG. 1 to FIG. 11. Therefore, an operation of the wireless power transmitter in the present embodiment is implemented by one or a combination of two or more of components of the wireless power transmitter of FIG. 1 to FIG. 11. For example, a multi-coil structure according to FIG. 17 may be included in a primary coil and the power conversion unit 110. In addition, the OOB communication module, in-band communication module, and control unit according to FIG. 17 may be the communication/control unit 120 or may be included in the communication/control unit 120.

The wireless power receiver in the embodiment of FIG. 17 corresponds to the wireless power receiver or wireless power receiver or power receiving unit disclosed in FIG. 1 to FIG. 11. Therefore, an operation of the wireless power receiver in the present embodiment is implemented by one or a combination of two or more of components of the wireless power receiver of FIG. 1 to FIG. 11. For example, the OOB communication module, in-band communication module, and control unit according to FIG. 17 may be the communication/control unit 220 or may be included in the communication/control unit 220.

Figure 18:
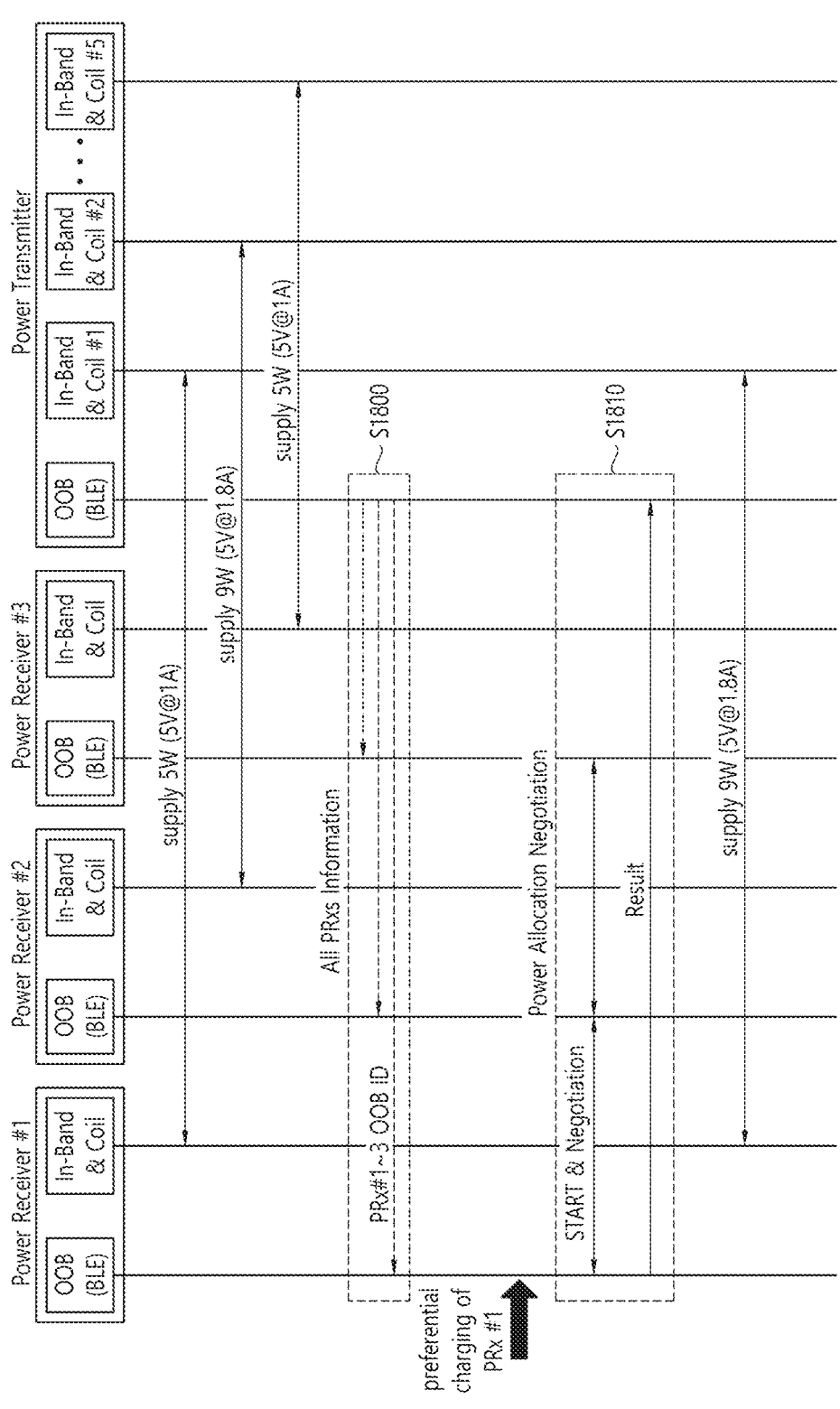
FIG. 18 is a flowchart illustrating a power allocation negotiation procedure according to an embodiment.

FIG. 18 is a flowchart illustrating a power allocation negotiation procedure according to an embodiment.

Hereinafter, a power allocation negotiation will be described, focusing on a wireless power receiver, with reference to FIG. 18. Herein, power allocation may be referred to as various terms such as power distribution or power division.

Referring to FIG. 18, a wireless power transmitter supplies wireless power to a plurality of wireless power receivers in a simultaneous or sequence or time division manner. The present embodiment assumes a case where three wireless power receivers are placed on the wireless power transmitter. In addition, it is assumed that power of 5 W is supplied to a first wireless power receiver (i.e., Power Receiver #1) and a third wireless power receiver (i.e., Power Receiver #3), and power of 9 W is supplied to a second wireless power receiver (i.e., Power Receiver #2).

The wireless power transmitter may transmit an OOB ID of wireless power receivers located on the wireless power transmitter to each of the Power Receiver #1, the Power Receiver #2, and the Power Receiver #3 through an information procedure for all wireless power receivers (all PRxs information procedure, S1800). If OOB communication is BLE communication, this may correspond to the Bluetooth ID of Table 5. Each wireless power receiver may determine whether it is being charged with the wireless power transmitter in a one-to-one charging or one-to-many charging manner, based on an OOB ID of another wireless power receiver.

In this situation, when it is necessary to preferentially charge the Power Receiver #1 or when it is necessary to change charging power of the Power Receiver #1, the Power Receiver #1 notifies this to the Power Receiver #2, the Power Receiver #3, and the wireless power transmitter. For this, a message indicating a start of a power allocation negotiation procedure (i.e., a start message) may be used.

In this case, the following methods may be used as a method in which the Power Receiver #1 notifies the start of the power allocation negotiation to the Power Receiver #2 and the Power Receiver #3.

As an example, the wireless power transmitter may start and perform the power allocation negotiation procedure (S1810) with the Power Receiver #2 and the Power Receiver #3 by using OOB communication, based on OOB ID information of the Power Receiver #2 obtained through the information procedure for all wireless power receivers and OOB ID information of the Power Receiver #3. An OOB message transmitted in this case may include an OOB ID of another wireless power receiver. In the present embodiment, wireless power receivers may operate by parsing only a message including an OOB ID thereof among the received messages.

As another example, the Power Receiver #1 may start and perform a power allocation negotiation procedure (S1810) by using a message used in a power allocation negotiation procedure with the Power Receiver #2 and the Power Receiver #3 (i.e., a start message, a negotiation message, etc.). In this case, an information field of a corresponding message may include the OOB ID of the wireless power transmitter. In the present embodiment, the wireless power receivers may operate by parsing only a message including the OOB ID of the wireless power transmitter which charges itself among the received messages.

During the power allocation negotiation procedure, the power allocation procedure is performed between the Power Receivers #1 to 3. Request power, negotiation priority (Nego Priority), or the like requested by each wireless power receiver in the power allocation negotiation procedure may be exchanged through an offer message.

For example, the Power Receiver #1 may receive the request power and negotiation priority of each wireless power receiver from the Power Receivers #2 and 3. In addition, based on this, the Power Receiver #1 may determine a power value to be allocated to each wireless power receiver. Thereafter, the Power Receiver #1 may transmit a negotiation result to the wireless power transmitter. Herein, the negotiation result may be transmitted to the wireless power transmitter by a representative wireless power receiver among the Power Receivers #1 to 3, or may be transmitted to the wireless power transmitter by each wireless power receiver.

The power allocation negotiation procedure will be described below in greater detail with reference to FIG. 20.

The wireless power transmitter in the embodiment of FIG. 18 corresponds to the wireless power transmitter or wireless power transmitter or power transfer unit disclosed in FIG. 1 to FIG. 11. Therefore, an operation of the wireless power transmitter in the present embodiment is implemented by one or a combination of two or more of components of the wireless power transmitter of FIG. 1 to FIG. 11. For example, operations according to FIG. 18, i.e., operations of transmitting or receiving a start message, starting a power allocation negotiation procedure, generating and transmitting information related to an OOB ID of a wireless power receiver, transmitting or receiving information on request power and/or negotiation priority, and receiving information on a power allocation negotiation result may be performed by the communication/control unit 120.

The wireless power receiver in the embodiment of FIG. 18 corresponds to the wireless power receiver or wireless power receiver or power receiving unit disclosed in FIG. 1 to FIG. 11. Therefore, an operation of the wireless power receiver in the present embodiment is implemented by one or a combination of two or more of components of the wireless power receiver of FIG. 1 to FIG. 11. For example, operations according to FIG. 18, i.e., operations of transmitting or receiving a start message, starting a power allocation negotiation procedure, receiving information related to an OOB ID of a wireless power receiver, transmitting or receiving information on request power and/or negotiation priority, and transmitting information on a power allocation negotiation result may be performed by the communication/control unit 220.

Figure 19:
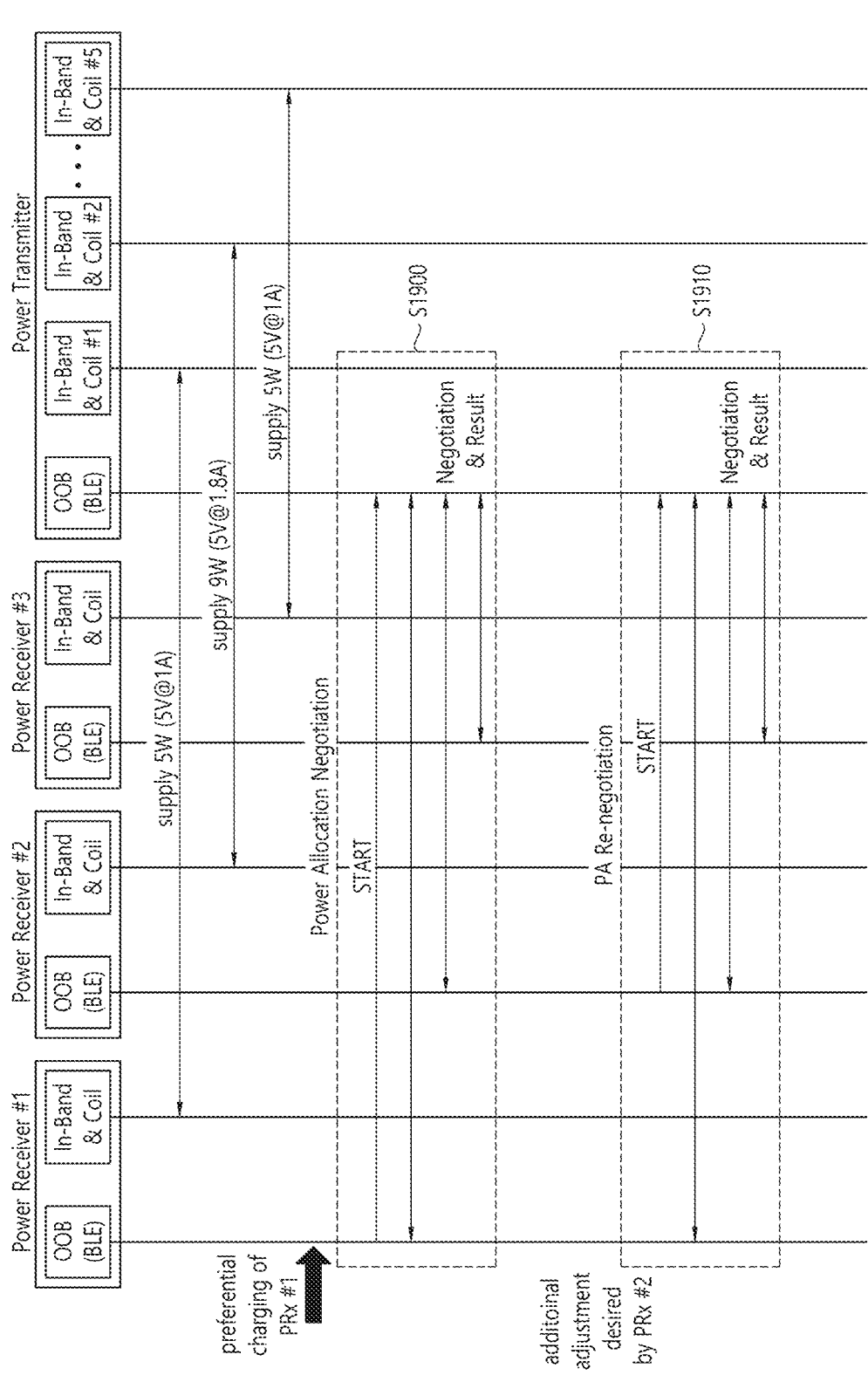
FIG. 19 is a flowchart illustrating a power allocation negotiation procedure according to another embodiment.

FIG. 19 is a flowchart illustrating a power allocation negotiation procedure according to another embodiment.

FIG. 19 relates to a power allocation negotiation, focusing on a wireless power transmitter.

Referring to FIG. 19, a wireless power transmitter supplies wireless power to a plurality of wireless power receivers in a simultaneous or sequence or time division manner. The present embodiment assumes a case where three wireless power receivers are placed on the wireless power transmitter. In addition, it is assumed that power of 5 W is supplied to a first wireless power receiver (i.e., Power Receiver #1) and a third wireless power receiver (i.e., Power Receiver #3), and power of 9 W is supplied to a second wireless power receiver (i.e., Power Receiver #2).

In this situation, when it is necessary to preferentially charge the Power Receiver #1 or when it is necessary to change charging power of the Power Receiver #1, the Power Receiver #1 notifies this to the Power Receiver #2, the Power Receiver #3, and the wireless power transmitter. For this, a message indicating a start of a power allocation negotiation procedure (i.e., a start message) may be used.

When the Power Receiver #1 informs the wireless power transmitter of the start of the power allocation negotiation in the power allocation negotiation procedure (S1900), the wireless power transmitter starts the negotiation for power allocation with each wireless power receiver. When the negotiation is complete, the wireless power transmitter transmits information on a negotiation result to the wireless power receivers.

Information on request power and negotiation priority (Nego Priority) requested by each device in the power allocation negotiation procedure may be exchanged between the devices.

The wireless power transmitter determines whether power requested by the wireless power receivers can be provided, and if it is possible to provide the power, provides the power by adjusting an amount of transmission power in accordance with the request power of each wireless power receiver. Otherwise, if it is not possible to provide the power, the amount of transmission power or a wireless power receiver for transmitting the power is determined based on negotiation priority information. Specifically, the wireless power transmitter compares the negotiation priority information of each wireless power receiver, determines power transmission preferentially in accordance with the request power of the wireless power receiver which preferentially requires charging, and transmits information on the determined result to each of the wireless power receivers.

If the result determined based on the information on request power and/or negotiation priority by the wireless power transmitter shows that the request power cannot be provided to the Power Receiver #2 and if the Power Receiver #2 still requires additional power allocation in a situation where information on the result is reported to the Power Receiver #2, the Power Receiver #2 may transmit to the wireless power transmitter a re-negotiation request message for power allocation. In this case, the wireless power transmitter and the wireless power receivers may perform again the power allocation negotiation procedure (S1920). The wireless power transmitter may transmit information on the renegotiation result to the wireless power receivers.

The wireless power transmitter in the embodiment of FIG. 19 corresponds to the wireless power transmitter or wireless power transmitter or power transfer unit disclosed in FIG. 1 to FIG. 11. Therefore, an operation of the wireless power transmitter in the present embodiment is implemented by one or a combination of two or more of components of the wireless power transmitter of FIG. 1 to FIG. 11. For example, operations based on FIG. 19, i.e., an operation of determining whether request power can be provided, an operation of receiving a negotiation request message, transmitting information on a negotiation result, and comparing negotiation priority information of each wireless power receiver, an operation of determining power transmission preferentially in accordance with the request power of the wireless power receiver which preferentially requires charging, an operation of transmitting information on the determined result to each of the wireless power receivers, an operation of receiving a re-negotiation request message, an operation of re-performing a power allocation negotiation procedure, and an operation of transmitting information a re-negotiation result may be performed by the communication/control unit 120.

The wireless power receiver in the embodiment of FIG. 19 corresponds to the wireless power receiver or wireless power receiver or power receiving unit disclosed in FIG. 1 to FIG. 11. Therefore, an operation of the wireless power receiver in the present embodiment is implemented by one or a combination of two or more of components of the wireless power receiver of FIG. 1 to FIG. 11. For example, operations according to FIG. 19, i.e., an operation of transmitting a negotiation request message, receiving information on a negotiation result, and receiving information on a determined result, an operation of transmitting a renegotiation request message, an operation of re-performing a power allocation negotiation procedure, and an operation of receiving information on a re-negotiation result may be performed by the communication/control unit 220.

Figure 20:
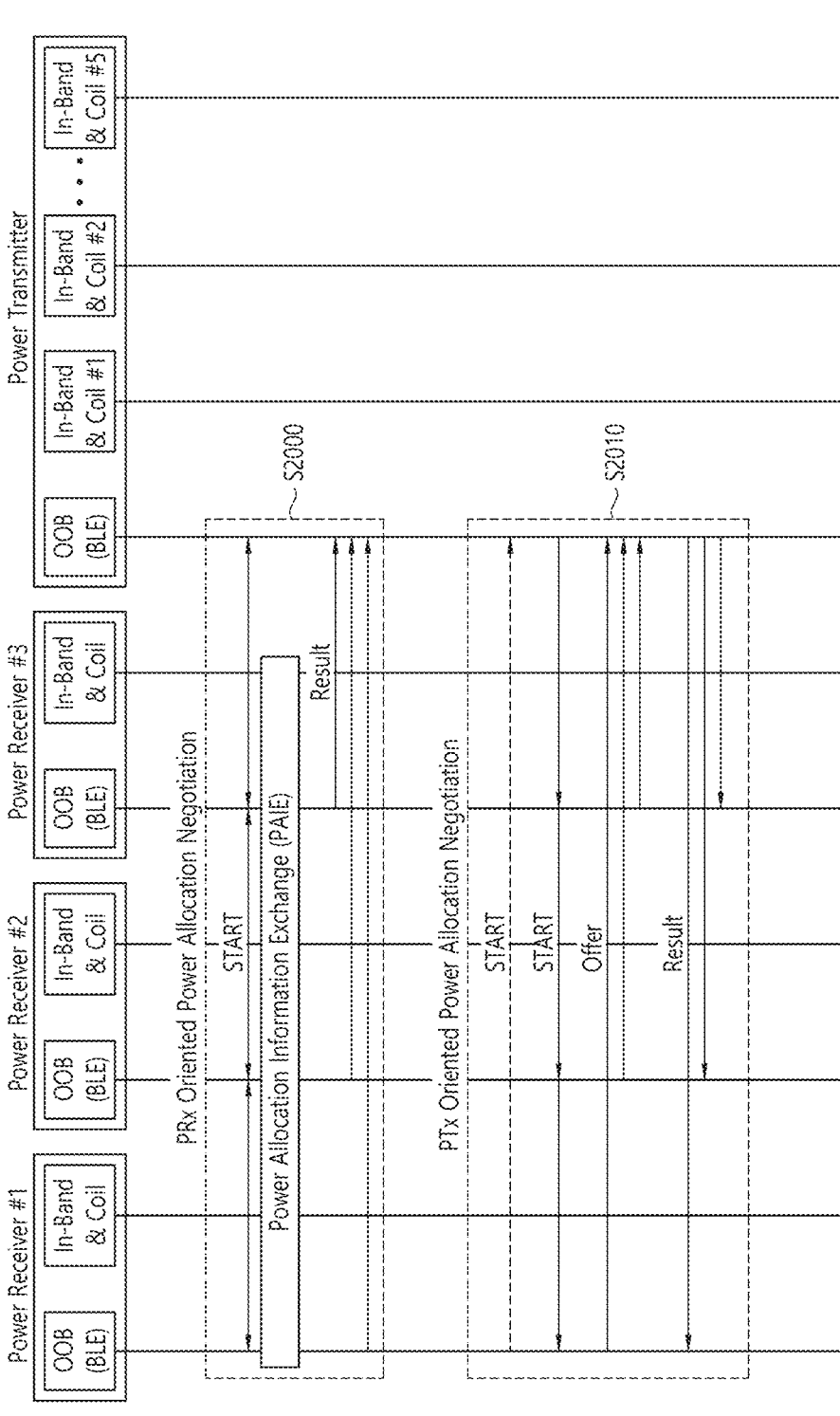
FIG. 20 is a detailed flowchart illustrating a power allocation negotiation procedure according to another embodiment.

FIG. 20 is a detailed flowchart illustrating a power allocation negotiation procedure according to another embodiment.

Referring to FIG. 20, in case of a power allocation negotiation (S2000) focusing on the wireless power receiver, determining of necessity for preferential charging of a first wireless power receiver may be performed by the wireless power receiver or the wireless power transmitter. A device which determines the necessity may transmit a start message to another device.

In the power allocation negotiation procedure, first to third wireless power receivers may enter a power allocation information exchange mode. In the mode, each of the devices may exchange and determine an amount of power to be requested by each of the devices. In this case, the aforementioned out-band message or proposed method may be used. Information on request power and/or negotiation priority may be included in the proposed message. The negotiation result may be transmitted from a wireless power receiver which starts the power allocation negotiation procedure to the wireless power transmitter.

In case of a power allocation negotiation (S2010) focusing on the wireless power transmitter, a start message may be exchanged between the wireless power transmitter and the wireless power receivers. The first to third wireless power receivers may transmit information on an amount of power desired by the devices to the wireless power transmitter through the proposed message. The wireless power transmitter may perform power allocation for each wireless power receiver, based on the proposed message received from each wireless power receiver, and may report a result thereof to the first to third wireless power receivers through a result message.

The wireless power transmitter in the embodiment of FIG. 20 corresponds to the wireless power transmitter or wireless power transmitter or power transfer unit disclosed in FIG. 1 to FIG. 11. Therefore, an operation of the wireless power transmitter in the present embodiment is implemented by one or a combination of two or more of components of the wireless power transmitter of FIG. 1 to FIG. 11. The operation of the wireless power transmitter according to FIG. 20 may be performed by the communication/control unit 120.

The wireless power receiver in the embodiment of FIG. 20 corresponds to the wireless power receiver or wireless power receiver or power receiving unit disclosed in FIG. 1 to FIG. 11. Therefore, an operation of the wireless power receiver in the present embodiment is implemented by one or a combination of two or more of components of the wireless power receiver of FIG. 1 to FIG. 11. For example, the operation of the wireless power receiver according to FIG. 20 may be performed by the communication/control unit 220.

Figure 21:
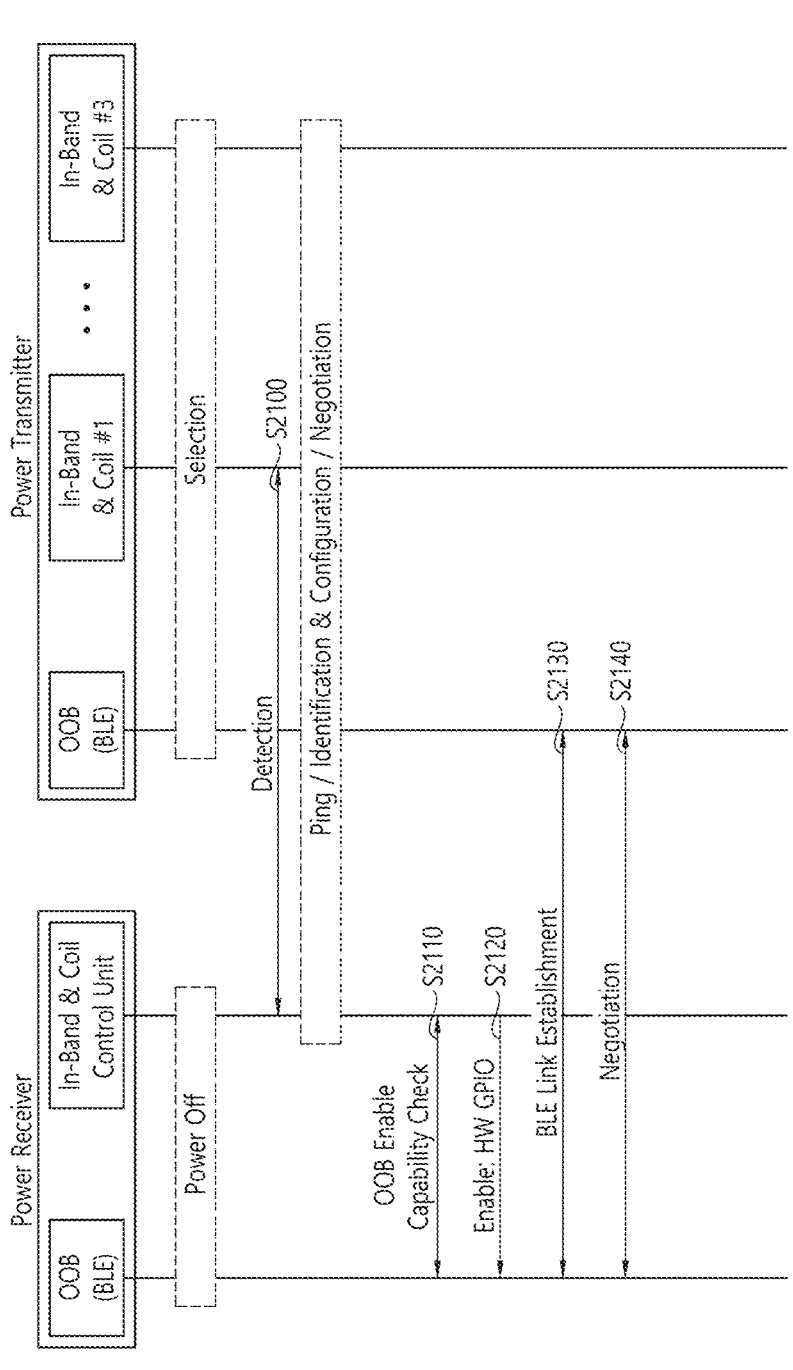
FIG. 21 is a detailed flowchart illustrating a procedure of enabling an out-band function according to an embodiment.

FIG. 21 is a detailed flowchart illustrating a procedure of enabling an out-band function according to an embodiment.

Referring to FIG. 21, in a selection phase, if a wireless power transmitter detects a wireless power receiver (or detects a placement of the wireless power receiver) (S2100), the wireless power transmitter and the wireless power receiver enter a negotiation phase via the ping phase and identification and configuration phase of FIG. 5 or FIG. 11 through in-band communication.

In the negotiation phase, the wireless power receiver determines whether an OOB communication module (or function) can be enabled also in a power-off state (S2110). In this case, an OOB enable capability check message may be used.

The OOB enable capability check message includes an operation of checking an off/off state of the OOB communication module (or function) of the wireless power receiver. In an aspect, the OOB enable capability check may include an operation of determining whether the OOB communication module (or function) of the wireless power receiver is configured in a hardware and/or software manner (e.g., in an SPI manner or the like) so as to connect (or interwork) with a control unit of the wireless power receiver (i.e., whether the out-of-band communication function or module can be enabled). In another aspect, the OOB enable capability check may include an operation in which the wireless power transmitter determines whether a current state of the OOB communication module (or function) of the wireless power receiver is a disable state.

If it is determined that the OOB communication module (or function) can be enabled, the control unit of the wireless power receiver may enable the OOB module of the wireless transmission reception device through an enable message (S2120).

If the OOB function of the wireless power receiver is enabled, the OOB module of the wireless power receiver and the OOB module of the wireless power transmitter may establish a short-range wireless communication link such as BLE or the like (S2130), and may proceed a negotiation through the communication link (S2140).

The wireless power transmitter in the embodiment of FIG. 21 corresponds to the wireless power transmitter or wireless power transmitter or power transfer unit disclosed in FIG. 1 to FIG. 11. Therefore, an operation of the wireless power transmitter in the present embodiment is implemented by one or a combination of two or more of components of the wireless power transmitter of FIG. 1 to FIG. 11. The operation of the wireless power transmitter according to FIG. 21 may be performed by the communication/control unit 120.

The wireless power receiver in the embodiment of FIG. 21 corresponds to the wireless power receiver or wireless power receiver or power receiving unit disclosed in FIG. 1 to FIG. 11. Therefore, an operation of the wireless power receiver in the present embodiment is implemented by one or a combination of two or more of components of the wireless power receiver of FIG. 1 to FIG. 11. For example, an operation of the wireless power receiver according to FIG. 21 may be performed by the communication/control unit 220.

Since not all constituting elements or phases are essential for a wireless power transmission apparatus and method or a wireless power reception apparatus and method according to embodiments of the present disclosure described above, the wireless power transmission apparatus and method or the wireless power reception apparatus and method may be performed by including whole or part of the constituting elements or phases described above. Also, embodiments of the wireless power transmission apparatus and method or the wireless power reception apparatus and method may be performed in combination thereof. Also, the constituting elements or phases do not necessarily have to be performed in the specific order described above, and a phase described later may be performed before a phase described earlier.

The description given above is merely an embodiment for illustrating technical principles of the present disclosure, and various changes and modifications are possible from the disclosure by those skilled in the art to which the present disclosure belongs without deviating from the inherent characteristics of the present disclosure. Therefore, it is possible that embodiments of the present disclosure described above may be implemented individually or in a combination thereof.

Therefore, it should be understood that embodiments disclosed in the present specification are not intended to limit the technical principles of the present disclosure but to support describing the present disclosure, and thus the technical scope of the present disclosure is not limited by the embodiments. The technical scope of the present disclosure should be judged by the appended claims, and all of the technical principles found within the range equivalent to the technical scope of the present disclosure should be interpreted to belong thereto.

What is claimed is:

1. A wireless power transmitter, comprising:
   a power converter including a plurality of primary coils and configured to transmit wireless power to a wireless power receiver by using at least one primary coil among the plurality of primary coils forming magnetic coupling with the wireless power receiver at an operating frequency; and
   a communicator/controller configured to communicate with the wireless power receiver by using the operating frequency based on in-band communication and communicate with the wireless power receiver by using a frequency different from the operating frequency based on out-band communication, wherein the wireless power transmitter is configured to:

transmit, to the wireless power receiver, a message including at least one out-band identifier of at least one different wireless power receiver based on the out-band communication, and receive, from the wireless power receiver, information of a negotiation result based on the out-band communication, and wherein the information of the negotiation result includes a result of negotiation for power allocation between the wireless power receiver and the at least one different wireless power receiver.

2. The wireless power transmitter of claim 1, wherein the wireless power transmitter receives at least one of information on negotiation priority and information on request power of a corresponding wireless power receiver from the wireless power receiver and the at least one different wireless power receiver based on the out-band communication.

3. The wireless power transmitter of claim 2, wherein the wireless power transmitter allocates power to each of wireless power receivers among the wireless power receiver and the at least one different wireless power receiver, based on at least one of information on negotiation priority and information on request power of each of the wireless power receivers.

4. The wireless power transmitter of claim 3, wherein the wireless power transmitter determines a power transmission target from among the wireless power receiver and the at least one different wireless power receiver, based on the information on the negotiation priority, if power requested by the wireless power receiver and the at least one different wireless power receiver cannot be provided.

5. A method for transmitting wireless power, the method comprising:

transmitting, to a wireless power receiver, a message including at least one out-band identifier of at least one different wireless power receiver based on an out-band communication; and receiving, from the wireless power receiver, information of a negotiation result based on the out-band communication, wherein the information of the negotiation result includes a result of negotiation for power allocation between the wireless power receiver and the at least one different wireless power receiver.

* * * * *